US012693897B2

(12) United States Patent
Zhu et al.

(10) Patent No.: US 12,693,897 B2
(45) Date of Patent: Jul. 28, 2026

(54) METHODS AND APPARATUS FOR SUPPORTING APPLICATION MOBILITY IN MULTI-ACCESS EDGE COMPUTING PLATFORM ARCHITECTURES

(71) Applicant: Huawei Technologies Co., Ltd., Shenzhen (CN)

(72) Inventors: Jiafeng Zhu, Pleasanton, CA (US); Jie Shen, San Jose, CA (US); Liya Chen, San Jose, CA (US); Feng Ye, Mississauga (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 468 days.

(21) Appl. No.: 18/318,246

(22) Filed: May 16, 2023

(65) Prior Publication Data

US 2023/0305899 A1 Sep. 28, 2023

Related U.S. Application Data

(63) Continuation of application No. PCT/US2020/061815, filed on Nov. 23, 2020.

(51) Int. Cl.
*G06F 9/50* (2006.01)
*G06F 9/48* (2006.01)
(Continued)

(52) U.S. Cl.
CPC .............. *G06F 9/5005* (2013.01); *G06F 9/48* (2013.01); *G06F 9/4806* (2013.01);
(Continued)

(58) Field of Classification Search
CPC ........ G06F 9/48; G06F 9/4806; G06F 9/4843; G06F 9/4881; G06F 9/50; G06F 9/55;
(Continued)

(56) References Cited

U.S. PATENT DOCUMENTS

| | | | |
|---|---|---|---|
| 10,379,842 B2 | 8/2019 | Malladi et al. | |
| 2014/0229221 A1* | 8/2014 | Shih ................ | G06Q 10/06312 705/7.23 |

(Continued)

FOREIGN PATENT DOCUMENTS

WO 2016113153 A1 7/2016

OTHER PUBLICATIONS

Dean, J., et al., "MapReduce: Simplified Data Processing on Large Clusters", Association OSDI 04: 6th Symposium on Operating Systems Design and Implementation, Oct. 3, 2004, 13 Pages.

(Continued)

*Primary Examiner* — Charles M Swift
(74) *Attorney, Agent, or Firm* — Slater Matsil, LLP

(57) ABSTRACT

A method implemented by a multi-access edge computing (MEC) distributed controller includes receiving a MEC computing task request for execution of a service on MEC nodes controlled by the MEC distributed controller; obtaining mobile device geo-location information associated with the mobile device; determining an execution plan and a pool of MEC nodes, the execution plan and the pool of MEC nodes being for the execution of the service, the determining being in accordance with the mobile device geo-location information; scheduling the execution plan for the pool of MEC nodes; and deploying the scheduled execution plan.

19 Claims, 13 Drawing Sheets

(51) Int. Cl.
    *H04L 67/10*         (2022.01)
    *H04L 67/52*         (2022.01)
    *H04L 67/60*         (2022.01)

(52) U.S. Cl.
    CPC .......... *G06F 9/4843* (2013.01); *G06F 9/4881*
        (2013.01); *G06F 9/50* (2013.01); *G06F*
        *9/5038* (2013.01); *G06F 9/5061* (2013.01);
        *G06F 9/5072* (2013.01); *H04L 67/10*
    (2013.01); *H04L 67/52* (2022.05); *H04L 67/60*
        (2022.05)

(58) Field of Classification Search
    CPC .... G06F 9/5038; G06F 9/5061; G06F 9/5072;
        H04L 67/10; H04L 67/52; H04L 67/60
    See application file for complete search history.

(56)            References Cited

U.S. PATENT DOCUMENTS

| | | | |
|---|---|---|---|
| 2016/0212007 A1* | 7/2016 | Alatorre | G06F 9/5066 |
| 2018/0367314 A1* | 12/2018 | Egner | H04L 63/107 |
| 2019/0129745 A1* | 5/2019 | Wang | H04L 41/0895 |
| 2020/0007414 A1* | 1/2020 | Smith | H04L 67/12 |
| 2020/0341336 A1* | 10/2020 | Pham | G02B 6/0051 |
| 2021/0027415 A1* | 1/2021 | Khalid | G06N 20/00 |

OTHER PUBLICATIONS

Zhi Cao et al., A Deep Reinforcement Learning Approach to Multi-component Job Scheduling in Edge Computing, arXiv:1908. 10290v3, Jan. 23, 2020, total 7 pages.

* cited by examiner

100

200

600

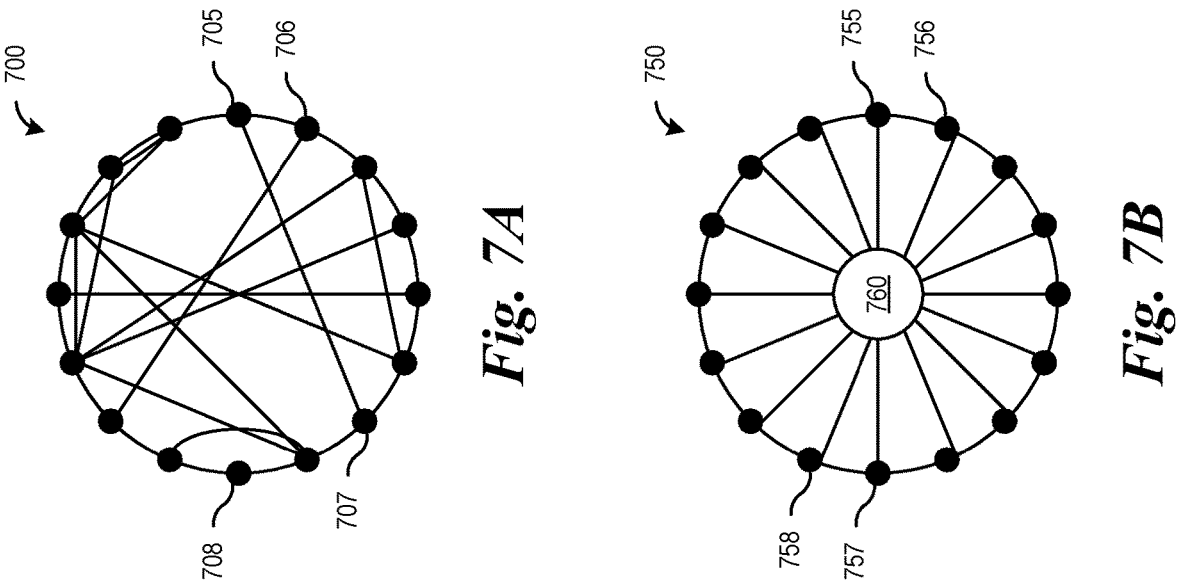
*Fig. 7A*
*Fig. 7B*
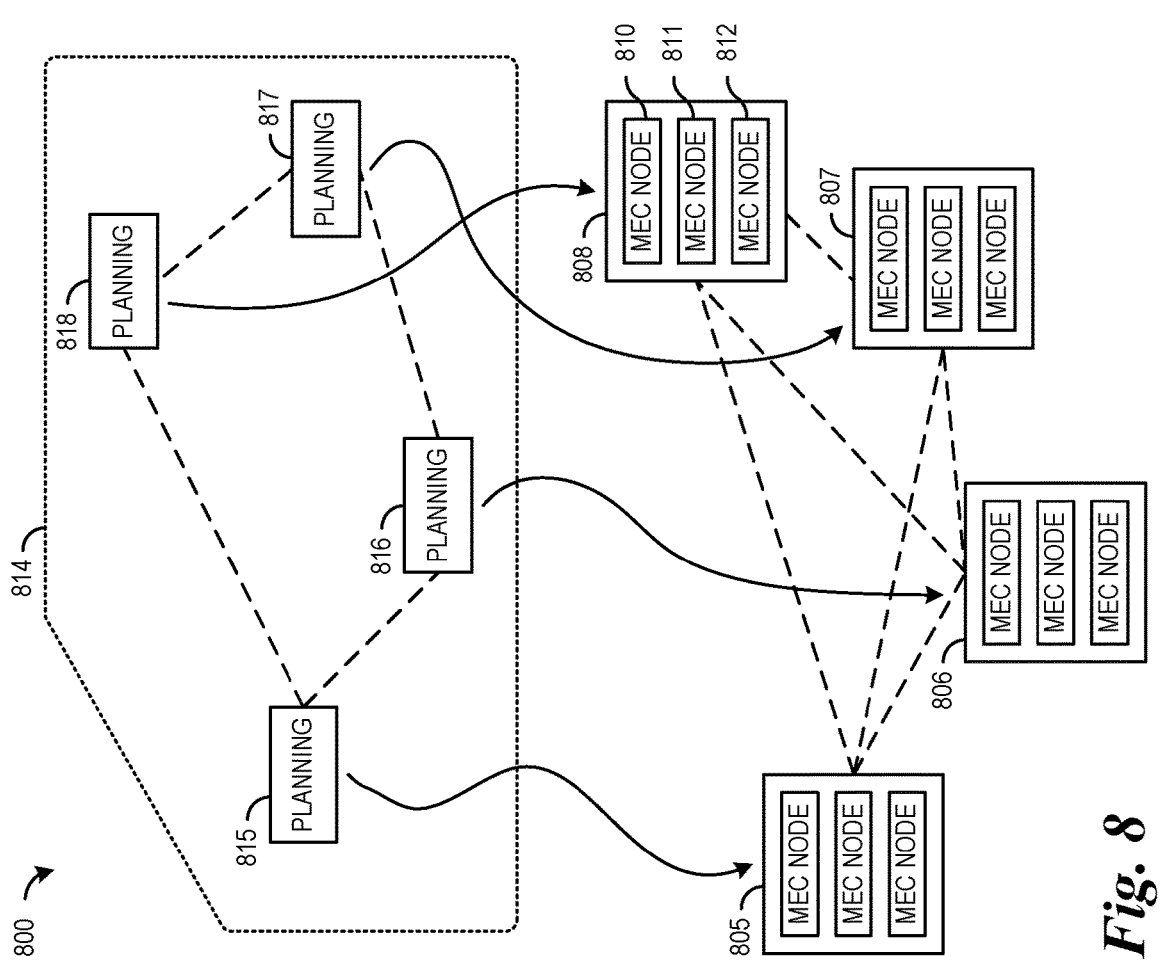
*Fig. 8*

1100
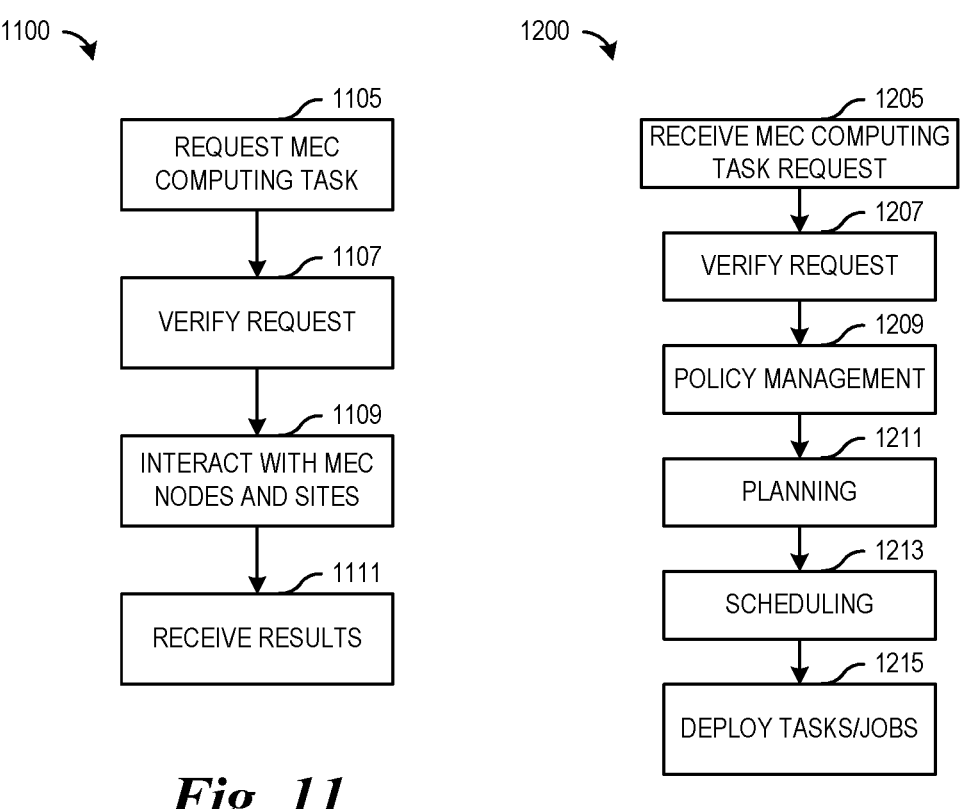
1105
REQUEST MEC COMPUTING TASK
1107
VERIFY REQUEST
1109
INTERACT WITH MEC NODES AND SITES
1111
RECEIVE RESULTS
Fig. 11
1200
1205
RECEIVE MEC COMPUTING TASK REQUEST
1207
VERIFY REQUEST
1209
POLICY MANAGEMENT
1211
PLANNING
1213
SCHEDULING
1215
DEPLOY TASKS/JOBS
Fig. 12
1300
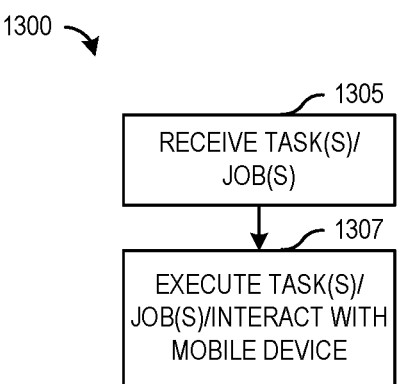
1305
RECEIVE TASK(S)/ JOB(S)
1307
EXECUTE TASK(S)/ JOB(S)/INTERACT WITH MOBILE DEVICE
Fig. 13

METHODS AND APPARATUS FOR SUPPORTING APPLICATION MOBILITY IN MULTI-ACCESS EDGE COMPUTING PLATFORM ARCHITECTURES

CROSS-REFERENCE TO RELATED APPLICATIONS

This application is a continuation of International Patent Application No. PCT/US2020/061815, filed on Nov. 23, 2020, entitled "Methods and Apparatus for Supporting Application Mobility in Multi-Access Edge Computing Platform Architectures," application of which is incorporated herein by reference in its entirety.

TECHNICAL FIELD

The present disclosure relates generally to methods and apparatus for digital computing, Fifth Generation (5G) telecommunication, autonomous driving, and, in particular embodiments, to methods and apparatus for supporting application mobility in multi-access edge computing (MEC) platform architectures.

BACKGROUND

The traditional cloud computing model is operable for certain mobile services that do not impose location or timing constraints and are not concerned with the quality of service (QoS). With mobile computing becoming increasingly popular, the timing and QoS restrictions of mobile applications present unique challenges. In particular, a moving vehicle may request services that exceed the capabilities of the current cloud-based solution, which may lead to failure in meeting some requirements of the application, such as latency requirements, QoS requirements, etc. Hence, serving mobile applications become a greater challenge.

Multi-access edge computing (MEC) generally offers a new computing model that extends the capability of what is ordinarily available in a mobile device, thereby enabling resource-limited mobile devices to not only offload the execution of computationally intensive tasks onto MEC nodes (for the benefit of power saving, for example), but also realize new services to mobile users, especially where new services come with ever increasing demands.

The mobile device may simply initiate requests or tasks to the MEC, provide interaction between the user and the tasks or requests, and provide results of the completed tasks to the user (wherein the user may be human or other devices). The offloading of the computationally intensive tasks onto the MEC nodes enables the execution of the tasks that would ordinarily be impossible to execute on the mobile devices. Furthermore, the ability to offload tasks also allows for the design of smaller and low-power battery efficient mobile devices by eliminating the need to provide a great amount of computational power.

However, as a mobile device moves, there may be a need to migrate services associated with the mobile device from one MEC node to another to offer optimal services to the mobile device. As an example, the mobile device may be served by a first MEC node. However, as the mobile device moves away from the first MEC node, a second MEC node may be able to better serve the mobile device. If the tasks executed on the first MEC node are not completed, it may be necessary to migrate the tasks to the second MEC node. The migrating of the tasks can incur significant latency and costs, which negatively impact the overall user experience. Therefore, there is a need for methods and apparatus for supporting service mobility in multi-access edge computing platform architectures.

SUMMARY

According to a first aspect, a method implemented by a multi-access edge computing (MEC) distributed controller is provided. The method comprising: receiving, by the MEC distributed controller from a mobile device, a MEC computing task request requesting computational nodes supporting execution of a service on MEC nodes controlled by the MEC distributed controller; obtaining, by the MEC distributed controller, geo-location information associated with the mobile device; determining, by the MEC distributed controller, an execution plan and a pool of MEC nodes, the execution plan and the pool of MEC nodes being for the execution of the service, the determining being in accordance with the geo-location information associated with the mobile device; scheduling, by the MEC distributed controller, the execution plan over the pool of MEC nodes; and deploying, by the MEC distributed controller, the scheduled execution plan.

In a first implementation form of the method according to the first aspect, the execution plan and the pool of MEC nodes being associated with the execution of the service for a time window or a specified number of MEC nodes.

In a second implementation form of the method according to the first aspect or any preceding implementation form of the first aspect, determining the execution plan comprising: partitioning, by the MEC distributed controller, the execution of the service into a plurality of tasks, with each task being executable on a MEC node; and selecting, by the MEC distributed controller, for each task in the plurality of tasks, a subset of the pool of MEC nodes in accordance with a selection function.

In a third implementation form of the method according to the first aspect or any preceding implementation form of the first aspect, the pool of MEC nodes being determined in accordance with one of a user account level of the mobile device or an account level of an owner of an application associated with the service.

In a fourth implementation form of the method according to the first aspect or any preceding implementation form of the first aspect, selecting the subset of the pool of MEC nodes comprising: generating, by the MEC distributed controller, for each MEC node of the pool of MEC nodes, a cost and a value for executing each task of the plurality of tasks on the MEC node; and selecting, by the MEC distributed controller, for each task of the plurality of tasks, a MEC node from the pool of MEC nodes for executing the task, the selecting being in accordance with the cost and the value for executing the task on the MEC node, thereby producing the subset of the pool of MEC nodes.

In a fifth implementation form of the method according to the first aspect or any preceding implementation form of the first aspect, scheduling the execution plan comprising assigning, by the MEC distributed controller, release times and deadline times to the selected subset of MEC nodes.

In a sixth implementation form of the method according to the first aspect or any preceding implementation form of the first aspect, deploying the scheduled execution plan comprising providing, by the MEC distributed controller, application data associated with the execution of the service to the selected subset of MEC nodes, the providing being in accordance with the release times and the deadline times.

In a seventh implementation form of the method according to the first aspect or any preceding implementation form of the first aspect, the release times comprising required start times and the deadline times comprising required finish times for the plurality of tasks.

In an eighth implementation form of the method according to the first aspect or any preceding implementation form of the first aspect, the MEC computing task request comprising at least one of a service account, a mobile device user identifier, or a number of MEC nodes the execution plan is intended to cover, and the geo-location information comprising at least a route of the mobile device.

In a ninth implementation form of the method according to the first aspect or any preceding implementation form of the first aspect, further comprising: updating, by the MEC distributed controller, the geo-location information of the mobile device in accordance with at least one of traffic information or emergency information; determining, by the MEC distributed controller, an updated execution plan and an updated pool of MEC nodes in accordance with the updated geo-location information; scheduling, by the MEC distributed controller, the updated execution plan over the updated pool of MEC nodes to produce an updated scheduled execution plan; and deploying, by the MEC distributed controller, the updated scheduled execution plan.

According to a second aspect, a MEC distributed controller is provided. The MEC distributed controller comprising: one or more MEC nodes configured to execute jobs; a receiver configured to receive, from a mobile device, a MEC computing task request requesting computational nodes supporting execution of a service on MEC nodes controlled by the MEC distributed controller; a choreographer operatively coupled to the receiver and to the one or more MEC nodes, the choreographer configured to: obtain geo-location information associated with the mobile device; determine an execution plan and a pool of MEC nodes, the execution plan and the pool of MEC nodes being for the execution of the service, the determining being in accordance with the geo-location information associated with the mobile device; schedule the execution plan over the pool of MEC nodes; and deploy the scheduled execution plan.

In a first implementation form of the MEC distributed controller according to the second aspect, the choreographer further configured to partition the execution of the service into a plurality of tasks, with each task being executable on a MEC node; and select, for each task in the plurality of tasks, a subset of the pool of MEC nodes in accordance with a selection function.

In a second implementation form of the MEC distributed controller according to the second aspect or any preceding implementation form of the second aspect, the pool of MEC nodes being determined in accordance with one of a user account level of the mobile device or an account level of an owner of an application associated with the service.

In a third implementation form of the MEC distributed controller according to the second aspect or any preceding implementation form of the second aspect, the choreographer further configured to generate, for each MEC node of the pool of MEC nodes, a cost and a value for executing each task of the plurality of tasks on the MEC node; and select, for each task of the plurality of tasks, a MEC node from the pool of MEC nodes for executing the task, the selecting being in accordance with the cost and the value for executing the task on the MEC node, thereby producing the subset of the pool of MEC nodes.

In a fourth implementation form of the MEC distributed controller according to the second aspect or any preceding implementation form of the second aspect, the choreographer further configured to assign release times and deadline times to the selected subset of MEC nodes.

In a fifth implementation form of the MEC distributed controller according to the second aspect or any preceding implementation form of the second aspect, the choreographer further configured to provide application data associated with the execution of the service to the selected subset of MEC nodes, the application data being provided in accordance with the release times and the deadline times.

In a sixth implementation form of the MEC distributed controller according to the second aspect or any preceding implementation form of the second aspect, the MEC computing task request comprising at least one of a service account, a mobile device user identifier, or a number of MEC nodes the execution plan is intended to cover, and the geo-location information comprising at least a route of the mobile device.

In a seventh implementation form of the MEC distributed controller according to the second aspect or any preceding implementation form of the second aspect, the choreographer further configured to update the geo-location information of the mobile device in accordance with at least one of traffic information or emergency information; determine an updated execution plan and an updated pool of MEC nodes in accordance with the updated geo-location information; schedule the updated execution plan over the updated pool of MEC nodes to produce an updated scheduled execution plan; and deploy the updated scheduled execution plan.

According to a third aspect, a MEC distributed controller is provided. The MEC distributed controller comprising: a non-transitory memory storage comprising instructions; and one or more processors in communication with the memory storage, wherein the one or more processors execute the instructions to cause the MEC distributed controller to: receive, from a mobile device, a MEC computing task request requesting computational nodes supporting execution of a service on MEC nodes controlled by the MEC distributed controller; obtain geo-location information associated with the mobile device; determine an execution plan and a pool of MEC nodes, the execution plan and the pool of MEC nodes being for the execution of the service, the determining being in accordance with the geo-location information associated with the mobile device; schedule the execution plan over the pool of MEC nodes; and deploy the scheduled execution plan.

In a first implementation form of the MEC distributed controller according to the third aspect, the instructions further causing the MEC distributed controller to partition the execution of the service into a plurality of tasks, with each task being executable on a MEC node; and select, for each task in the plurality of tasks, a subset of the pool of MEC nodes in accordance with a selection function.

In a second implementation form of the MEC distributed controller according to the third aspect or any preceding implementation form of the third aspect, the pool of MEC nodes being determined in accordance with one of a user account level of the mobile device or an account level of an owner of an application associated with the service.

In a third implementation form of the MEC distributed controller according to the third aspect or any preceding implementation form of the third aspect, the instructions further causing the MEC distributed controller to generate, for each MEC node of the pool of MEC nodes, a cost and a value for executing each task of the plurality of tasks on the MEC node; and select, for each task of the plurality of tasks, a MEC node from the pool of MEC nodes for executing the task, the selecting being in accordance with the cost and the value for executing the task on the MEC node, thereby producing the subset of the pool of MEC nodes.

In a fourth implementation form of the MEC distributed controller according to the third aspect or any preceding implementation form of the third aspect, the instructions further causing the MEC distributed controller to assign release times and deadline times to the selected subset of MEC nodes.

In a fifth implementation form of the MEC distributed controller according to the third aspect or any preceding implementation form of the third aspect, the instructions further causing the MEC distributed controller to provide application data associated with the execution of the service to the selected subset of MEC nodes, the application data being provided in accordance with the release times and the deadline times.

In a sixth implementation form of the MEC distributed controller according to the third aspect or any preceding implementation form of the third aspect, the MEC computing task request comprising at least one of a service account, a mobile device user identifier, or a number of MEC nodes the execution plan is intended to cover, and the geo-location information comprising at least a route of the mobile device.

In a seventh implementation form of the MEC distributed controller according to the third aspect or any preceding implementation form of the third aspect, the instructions further causing the MEC distributed controller to update the geo-location information of the mobile device in accordance with at least one of traffic information or emergency information; determine an updated execution plan and an updated pool of MEC nodes in accordance with the updated geo-location information; schedule the updated execution plan over the updated pool of MEC nodes to produce an updated scheduled execution plan; and deploy the updated scheduled execution plan.

An advantage of a preferred embodiment is that the planning of task assignments is performed in accordance with the geo-location information of the mobile device. Hence the tasks are assigned based on the predicted location and time of the mobile device, thereby preventing situations where a task has to be suspended and moved mid-execution. Because the planning and scheduling of the tasks and jobs associated with an application are performed in accordance with the geo-location information of the mobile device, which includes a planned route of the mobile device, geographical information, real-time traffic information, emergency information, weather, and so on, task migration (which may occur when a task assigned to a processing resource is unable to complete prior to the mobile device leaves the service area associated with the processing resource) is minimized.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 7A illustrates a first example configuration of MEC node connectivity according to example embodiments presented herein;

FIG. 7B illustrates a second example configuration of MEC node connectivity according to example embodiments presented herein;

FIG. 8 illustrates a MEC platform highlighting decentralized planning functions of MEC system choreography functions of MEC sites according to example embodiments presented herein;

FIG. 11 illustrates a flow diagram of example operations occurring in a mobile device offloading a service to a MEC platform according to example embodiments presented herein;

FIG. 12 illustrates a flow diagram of example operations occurring in offloading a service to a MEC platform according to example embodiments presented herein;

FIG. 13 illustrates a flow diagram of example operations occurring in a MEC node executing an offloaded service according to example embodiments presented herein;

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
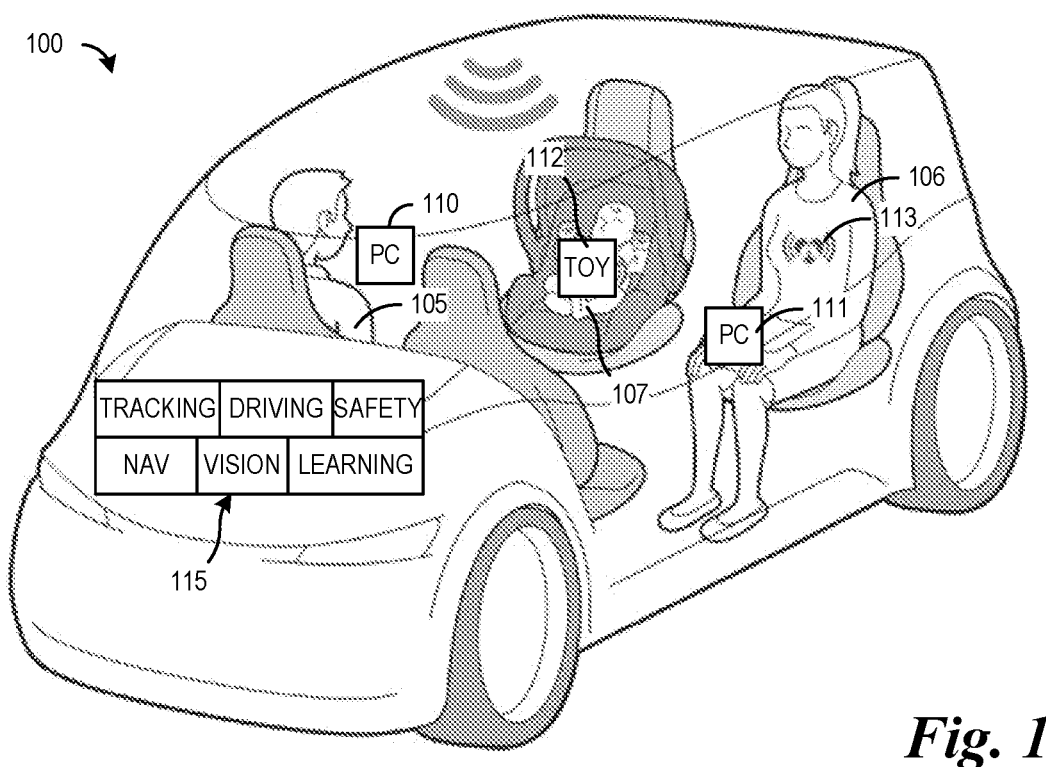
FIG. 1 illustrates an example autonomous vehicle.

FIG. 1 illustrates an example autonomous vehicle 100. Autonomous vehicle 100 includes a plurality of users, such as users 105-107 with mobile devices, such as PCs 110-111, toys 112, health sensors 113, etc. The mobile devices may be executing applications, such as games, productivity applications, video conferencing applications, content consumption applications, and so on. The applications may make use of services, such as game services, media content streaming services, conferencing services, data aggregation services, monitoring services, and so forth. In addition to the users and their mobile devices, autonomous vehicle 100 also includes applications, such as tracking, autonomous driving, safety, navigation, machine learning, machine vision, voice recognition, gesture recognition, and so forth, applications. As used herein, the term mobile device will be used to refer to electronic devices located in autonomous vehicle 100 (such as computer modules for tracking, autonomous driving, safety, navigation, machine learning, machine vision, voice recognition, gesture recognition, and so forth) and mobile devices used by users located within autonomous vehicle 100 (such as PCs, toys, game consoles, health sensors, etc.).

In general, the applications of the mobile devices or services utilized by the applications executing on the mobile devices may have high computational requirements. In many instances, the computation requirements may exceed the computational capabilities of the mobile devices. This is especially true in situations when multiple applications are simultaneously executing on a single device.

Multi-access edge computing (MEC) platform architectures have been utilized to allow for the offloading the execution of applications onto MEC nodes that feature more computational resources than a mobile device interacting with the application. The MEC nodes may receive, from the mobile device, a request to execute a service associated with an application, data to be processed by the service, as well as interaction with the user (if any), and execute the service. The MEC nodes would then provide the results of the execution of the service back to the mobile device.

Hence, although the service is executed on MEC nodes, input and output for the service, along with interaction with the service, occurs through the mobile device. In other words, the MEC nodes provide the computational resources to execute the service, but the intent is to make it appear as if the service is executing on the mobile device.

The MEC nodes feature great computational resources with ultra-low latency. In order to offer good performance and meet user experience expectations, applications require continuous service from the MEC nodes and uninterrupted user interaction as the mobile device moves from start to destination. Service without significant or noticeable interruption is a requirement of the MEC smart road scenario.

However, if the mobile device is moving too rapidly or if the execution of the services takes an extended amount of time, it may be possible for the mobile device to move from the service area of a first MEC site that include a first MEC node that is executing the service, and into the service area of a second MEC site. In such a situation, it may be necessary to suspend the execution of the service at the first MEC node and migrate the service to a second MEC node located at the second MEC site. Migrating the service can introduce delay to the execution of the service, which may be detrimental to the performance of the application or to the user experience of the user of the application. As an example, quality of service (QoS) requirements or latency requirements may be violated. As an example, the delay may result in a mis-detection of an object in front of an autonomous vehicle 100 in a machine vision application, resulting in a serious safety condition. As another example, the delay may result in the user losing a video game. As yet another example, the delay may introduce jitter to a video stream, leading to a bad video consumption experience.

Therefore, there is a need for methods and apparatus that support service mobility in multi-access edge computing platform architectures. The methods and apparatus support service mobility so that execution of a service seamlessly switches between MEC nodes and MEC sites, thereby preventing service interruption. Support for service mobility addresses service interruption that arises from migrating tasks associated with the services between MEC nodes. Service mobility may often be referred to as application mobility, because services support applications. Therefore, application mobility may be used in place of service mobility.

In general, autonomous vehicles and in-vehicle applications have the following technical requirements:

Inter-MEC service mobility: automobile applications add a new requirement on the basis of large bandwidth and low latency. Ultra-fast service mobility requires MEC assisted computing migrating between different MEC nodes.

Cross edge nodes service continuity: automobile applications (such as those described previously) need high frequency interaction with MEC nodes (on the order to 40-60 times per second) for the MEC nodes along the path of the automobile.

Low latency guarantee: With the autonomous vehicle's high mobility, moving large amounts of real-time data between MEC nodes (as well as the autonomous vehicle) makes it difficult to guarantee low latency and other QoS requirements.

Challenges Associated with MEC Include:

Mobile device mobility and application service continuity in the MEC environment: service mobility may not be the main scenario in the cloud. There is no need to migrate the application due to movements of the client (i.e., the mobile device). The migration usually involves migration of the entire virtual machine (VM), which may be costly. Furthermore, sequential migration that follows the mobility of the mobile device is not addressed.

Guaranteed QoS requirements for migrating applications: to satisfy the QoS requirements while maintaining the high availability of services during migration may be very challenging.

Dynamic scheduling: decoupling MEC application deployment and MEC node mapping may automatically schedule the service execution plan.

An object may be to fulfill the requirements of service continuity with fast moving applications in a Fifth Generation Core (5GC) MEC network.

Figure 2:
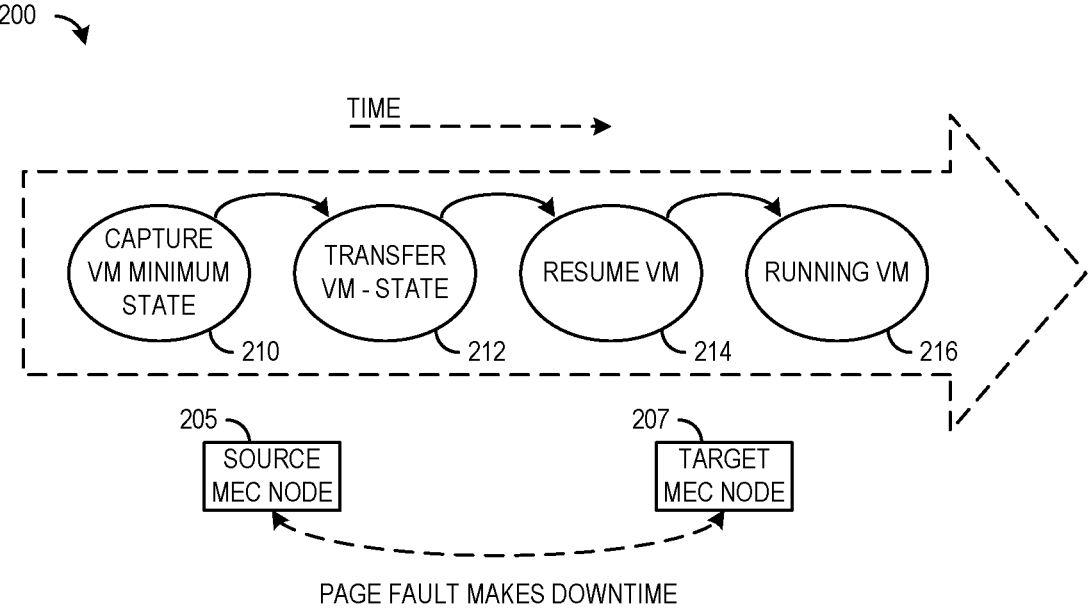
FIG. 2 illustrates a diagram of the migration of a service.

FIG. 2 illustrates a diagram 200 of the migration of a service. FIG. 2 illustrates the migration of a service from a source MEC node 205 to a target MEC node 207, with time increasing from left to right. At source MEC node 205, the migration of the service may include the capturing of a VM minimum state (event 210), which includes the state of state machines of a VM that is executing the service, as well as data being processed by the VM and any unprocessed inputs or outputs for the service. The VM minimum state is transferred from source MEC node 205 to target MEC node 207 (event 212). The VM minimum state may be large, especially for services that involve large amounts of data, such as machine vision, gesture detection, feature detection, etc. The transfer of the VM minimum state may then involve moving large amounts of data between MEC nodes or MEC sites.

At target MEC node 207, the VM is resumed (event 214). Resuming the VM may include initiating a new VM with the transferred VM minimum state, for example. Target MEC node 207 runs the resumed VM (event 216). Further service migration may be needed if the service does not complete execution prior to the mobile device exiting the coverage of a MEC site that includes target MEC node 207.

According to an example embodiment, an application framework supporting service mobility is provided. The application framework uses data flow graphs to decompose computing and data dependencies, as well as the order of execution, of a service. The service may be decomposed into multiple computing and data independent layers, which are hereby referred to herein as independent layers. In an embodiment, each independent layer is mapped to a MEC resource for execution. The application framework regulates the software architecture paradigm for transferring layer-by-layer computing result between different MEC resources.

In an embodiment, the data flow is parsed at different execution steps according to the speed of the mobile device executing the interactive application, and mapped to the abstract MEC node.

The layers of the data flow graph represent the ways in which various operations are combined. In an embodiment, computing tasks are mapped to different MEC nodes with constraint parameters to enable the execution times to meet user service level agreement (SLA) requirements and QoS restrictions.

Figure 3:
FIG. 3 illustrates a diagram of an example mapping of a service to multi-access edge computing (MEC) nodes of a MEC network, where the MEC nodes will execute at least a portion of the service according to example embodiments presented herein.

FIG. 3 illustrates a diagram 300 of an example mapping of a service to MEC nodes of a MEC network 305, where the MEC nodes will execute at least a portion of the service. Although the service is executed on MEC nodes, input and output for the service, along with interaction with the service, occurs through the mobile device. In other words, the MEC nodes provide the computational resources to execute the service, but the intent is to make it appear as if the service is executing on the mobile device. Hence, the execution of the service on the MEC nodes is transparent to the mobile device or the user of the mobile device.

MEC network 305 includes a radio access network (RAN) 307 that provides wireless connectivity for the mobile devices to a MEC platform 309. RAN 307 may utilize one or more wireless communication protocols, e.g., the Third Generation Partnership Project (3GPP) long term evolution (LTE), LTE advanced (LTE-A), 5G, 5G LTE, 5G NR, sixth generation (6G), High Speed Packet Access (HSPA), the IEEE 802.11 family of standards, such as 802.11a/b/g/n/ac/ad/ax/ay/be, etc.

MEC platform 309 provides computational resources for execution services associated with applications of devices. MEC platform 309 may include a plurality of MEC sites deployed at a variety of locations, such as along major roads and highways, buildings, cellular telephone towers, schools, shopping centers, malls, traffic lights, etc. Each MEC site may include one or more MEC nodes (providing computing resources, memory resources, storage resources, etc.) for executing applications in VMs. In general, each MEC node has considerably more resources (multiple multi-core processors, multiple gigabytes of memory, high bandwidth connectivity, etc.) than the mobile devices.

MEC platform 309 is connected to a packet core 311, which provides voice and data services on a network. As an example, packet core 311 provides mobility management, data routing management, interface management, etc. MEC network 305 also includes Internet 313 coupled to packet core 311. Internet 313 provides connectivity to services, for example. As shown and used herein, the component Internet 313 merely comprises an interface to the Internet.

MEC platform 309 may include a MEC abstraction layer 320 and an M-app framework layer 340. The MEC abstraction layer 320 includes abstracted MEC sites, such as MEC sites 322-326. Each MEC site may be assigned to execute tasks associated with one or more layers of a service. An example of application layer mapping is provided below.

As shown in FIG. 3, a service 330 that a mobile device intends to offload is decomposed in to N layers (layers 332-336) based on computing and data dependencies. Service 330 is representative of a service that the mobile device intends to offload to MEC platform 309 for execution. In addition to being decomposed by computing and data dependencies, the layers are sequentially numbered to indicate an order of execution. The layers of service 330 are mapped into an M-app framework layer 340, where they are labeled with similar reference numeral, but with an added apostrophe (') to simplify discussion and reduce confusion. As an example, layer 1 is referred to by reference numeral 332 in service 330, but by reference numeral 332' after mapping to M-app framework layer 340.

In an embodiment, the application framework maps one or more layers of a service onto one or more MEC nodes of a MEC site. As an example, layer 1 332' is mapped to MEC nodes of MEC site 323. As another example, layers 3 334' and 4 335' are mapped to MEC nodes of MEC site 325.

As shown in FIG. 3, no layer of service 330 is mapped to MEC site 322. In general, a layer of a service may not be mapped to a MEC site if the MEC site does not meet a selection criterion for mapping layers of the application to the MEC site. Examples of selection criterion may include expected completion time, application priority, mobile device priority, user priority, available computing resources, and so on. As an example, there may be insufficient processing resources at a MEC site to map a layer of a service. As another example, there may be sufficient processing resources at a MEC site, but an expected completion time for the layer is after a desired completion for the layer. Although no layer of service 330 is mapped to MEC site 322, one or more layers of other services may be mapped to MEC nodes of MEC site 322.

Figure 4:
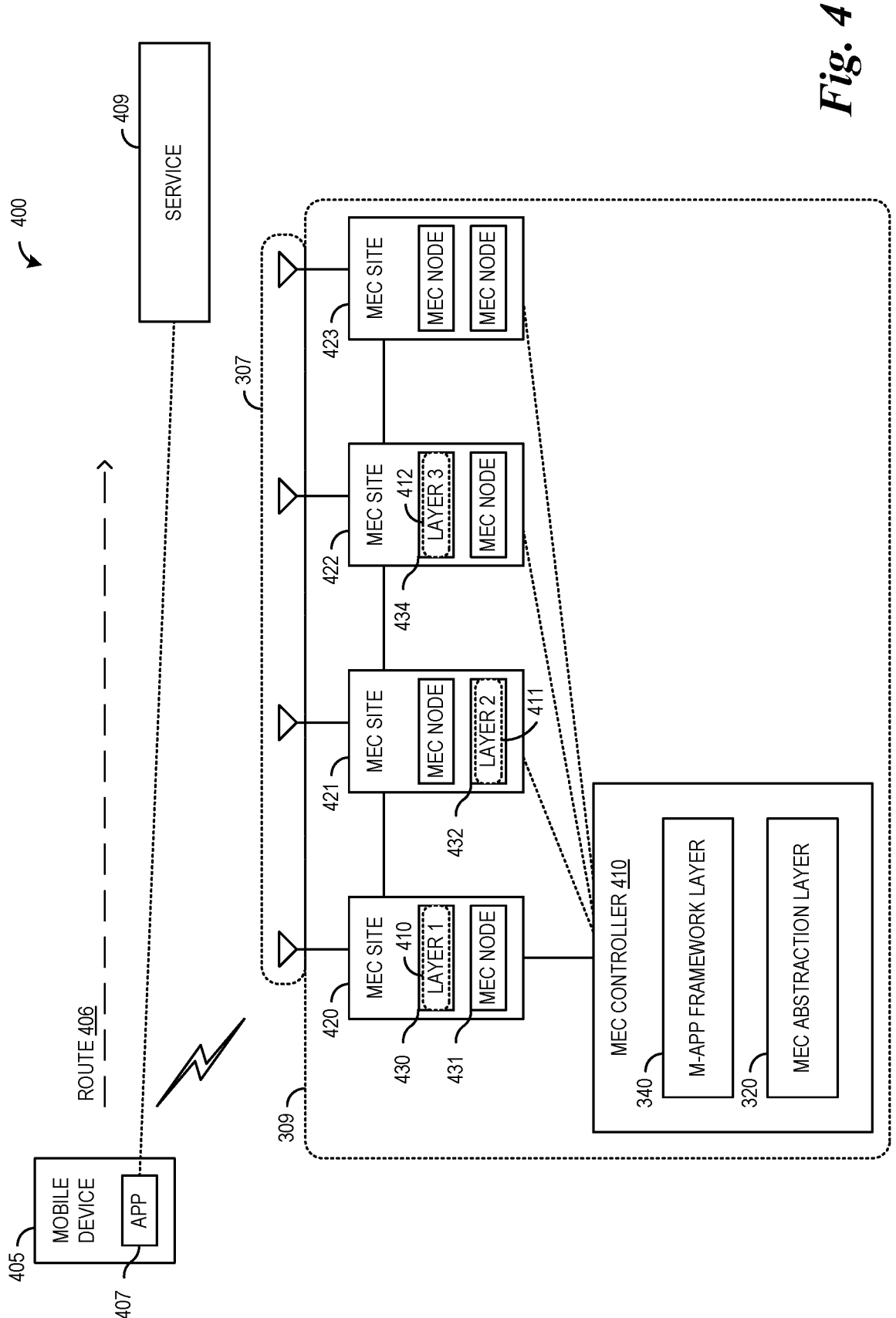
FIG. 4 illustrates a communication system highlighting support for offloading service execution by a mobile device according to example embodiments presented herein.

FIG. 4 illustrates a communication system 400 highlighting support for offloading service execution by a mobile device 405. As shown in FIG. 4, mobile device 405 is in motion along route 406 and is interacting with application 407. Application 407 is interacting with a service 409. Rather than executing service 409 associated with application 407 using its own computational resources, mobile device 405 offloads the execution of service 409 onto MEC platform 309. Mobile device 405 communicates with MEC platform 309 using RAN 307 (shown as antennas).

Mobile device 405 may send a MEC task request to MEC controller 410 to initiate the offloading of service 409. The MEC task request may specify the service name of service 409, for example. M-app framework layer 340 decomposes service 409 into independent layers, as discussed previously. In an embodiment, M-app framework layer 340 decomposes service 409 in response to receiving the MEC task request. In another embodiment, services supported by MEC platform 309 are decomposed a priori and stored in a memory or database for subsequent use. MEC abstraction layer 320 maps the independent layers of service 409 to MEC nodes of MEC sites. A detailed discussion of the mapping of the independent layers of service 409 to MEC nodes of MEC sites is provided below.

As an illustrative example, service 409 is decomposed into three independent layers: layer 1 410, layer 2 411, and layer 3 412. As discussed previously, mobile device 405 is moving along route 406, and MEC platform 309 includes MEC sites 420, 421, 422, and 423 positioned along route 406. The three independent layers are mapped onto MEC sites 420, 421, and 422, which have coverage areas that include route 406. As shown in FIG. 4, layer 1 410 is mapped to MEC node 430 of MEC site 420. MEC node 431 is not assigned a layer of service 409, however, MEC node 431 may not be idle because it may be executing a layer of another service. Similarly, layer 2 411 is mapped to MEC node 432 of MEC site 421 and layer 3 412 is mapped to MEC node 434 of MEC site 422.

In an embodiment, the mapping of the independent layers to MEC nodes of MEC sites is in accordance with geo-location information of mobile device 405. Geo-location information comprises geographical and location information of mobile device 405, and may include information such as location information provided by a Global Navigation Satellite System (GNSS) (such as Global Positioning System (GPS), Globalnaya Navigatsionnaya Sputnikovaya Sistema (GLONASS), Galileo, BeiDou Navigation Satellite System (BDS), etc.), cellular communication system based location measurement information, velocity information, topography information, geography information, navigation system information, traffic information, emergency services information, weather information, and so on. The geo-location information may provide information regarding the current location of mobile device 405, as well as predicted locations of mobile device 405 at different times in the future. As an example, GNSS information may be used to provide the current location, velocity, and direction of mobile device 405. It may be possible to predict the future location of mobile device 405 based on navigation information, traffic information, emergency services information, topography information, geography information, weather information, and so on.

Figure 5:
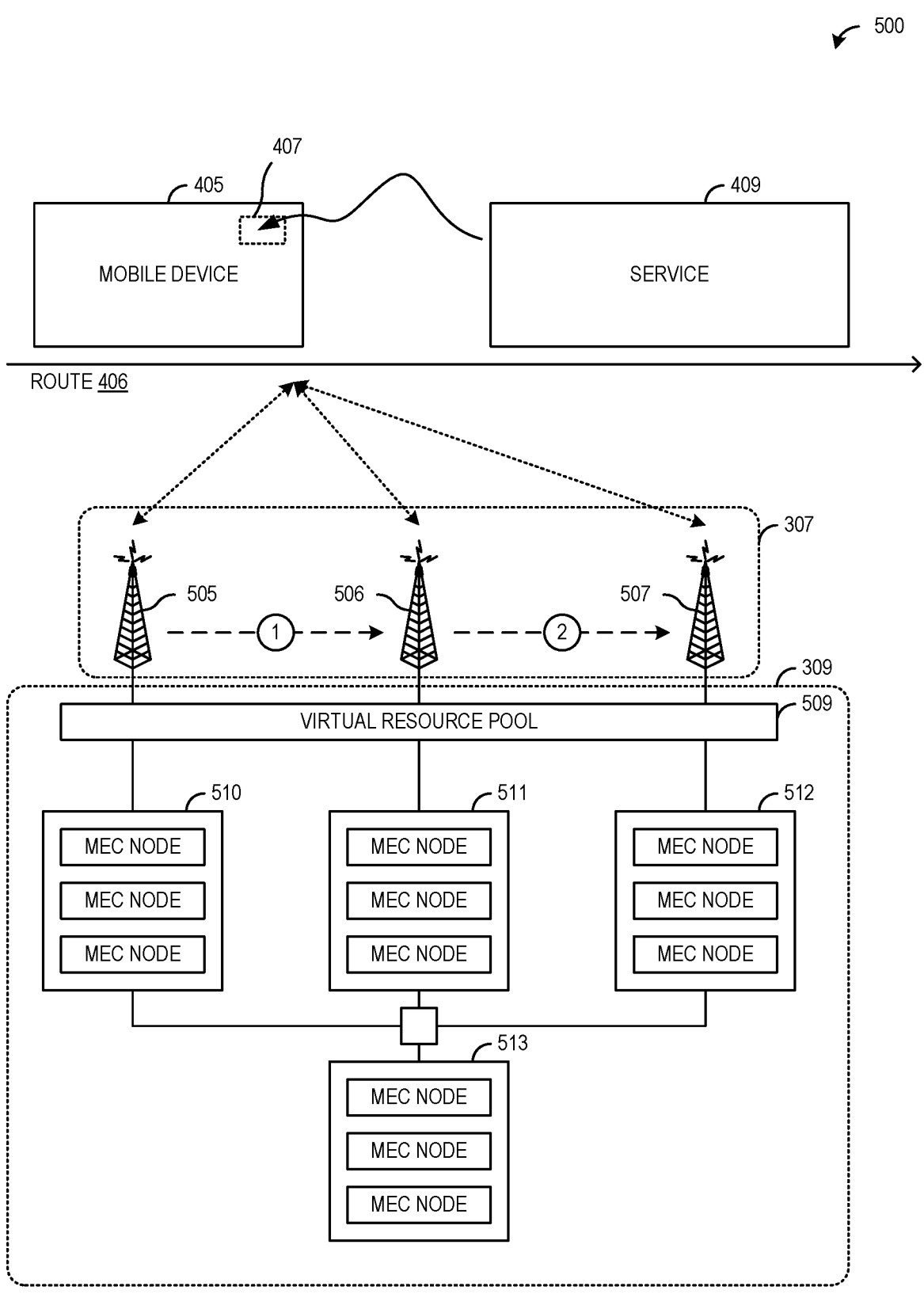
FIG. 5 illustrates a communication system highlighting a virtual resource pool used to provide support for offloading service execution by mobile device according to example embodiments presented herein.

FIG. 5 illustrates a communication system 500 highlighting a virtual resource pool used to provide support for offloading service execution by mobile device 405. As shown in FIG. 5, mobile device 405 is in motion along route 406 and is interacting with service 409 associated with application 407. Rather than executing service 409 using its own computational resources, mobile device 405 offloads the execution of service 409 onto MEC platform 309. Mobile device 405 communicates with MEC platform 309 using RAN 307 (shown as antennas 505, 506, and 507).

As mobile device 405 moves along route 406, mobile device 405 may leave the coverage of a first antenna or enter the coverage of a second antenna. In some situations, mobile device may be in the coverage of multiple antennas. As shown in FIG. 5, mobile device 405 is under the coverage of antennas 505, 506, and 507.

A virtual resource pool 509 represents the available MEC nodes of the MEC sites capable of communicating with mobile device 405 as mobile device 405 moves along route 406. In an embodiment, virtual resource pool 509 includes available MEC nodes that are capable of communicating with mobile device 405 within a particular time window. Hence, virtual resource pool 509 may exclude MEC nodes that are capable of communicating with mobile device 405, but only at a significant time in the future. Excluding such MEC nodes may be advantageous because mobile device 405 may no longer be on route 406 so far in the future and planning for such a possibility may be a waste of resources.

Furthermore, uncertainty typically increases with time, hence planning so far into the future may yield inaccurate results.

As an example, virtual resource pool 509 may include a subset of the MEC nodes of MEC sites 510, 511, 512, and 513. In general, a MEC node may be a part of virtual resource pool 509 for mobile device 405 if the MEC node has sufficient computation resources to execute a particular layer of service 409 and complete the execution before a deadline. The deadline is associated with the execution of the particular layer while mobile device 405 is within coverage of a MEC site including the MEC node. If the MEC node has insufficient computational resources or is incapable of completing the execution before the deadline, the MEC node is not included as a member of virtual resource pool 509.

Figure 6:
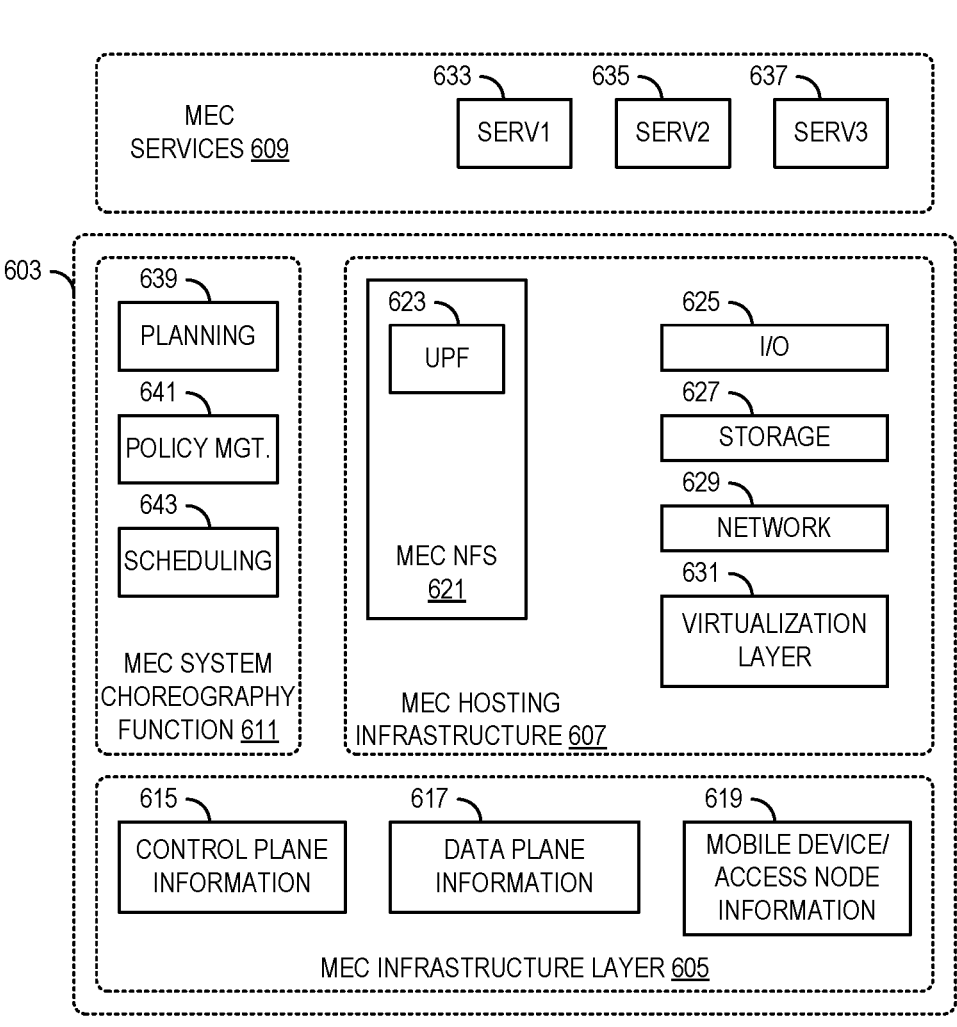
FIG. 6 illustrates a high-level view of a MEC site according to example embodiments presented herein.

FIG. 6 illustrates a high-level view of a MEC site 600. The high-level view of MEC site 600 presents a view of the software framework of MEC site 600. The high-level view of MEC site 600 includes MEC services 609 and a MEC distributed controller 603. The MEC distributed controller 603 includes a MEC infrastructure layer 605, a MEC hosting infrastructure 607, and a MEC system choreography function 611.

MEC distributed controller 603 includes components used in controlling the operation of MEC site 600, as well as planning, scheduling, and distributing layers of offloaded services executing on resources of MEC site 600. In an embodiment, MEC distributed controller 603 performs planning, scheduling, and distributing of layers of offloaded services executing on resources of MEC site 600, as well as resources of other MEC sites in close proximity to MEC site 600.

MEC infrastructure layer 605 includes information related to the configuration of MEC site 600, including control plane information 615 for the configuration of the control plane of MEC site 600, data plane information 617 for the configuration of the data plane of MEC site 600, and mobile device or access node information 619 for the configuration of mobile devices or access nodes coupled to MEC site 600. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while mobile devices may also be commonly referred to as mobile stations, mobiles, terminals, users, subscribers, stations, user equipments (UEs), and the like.

MEC hosting infrastructure 607 includes information related to the configuration of resources of MEC site 600. In the embodiment shown, the MEC hosting infrastructure 607 includes MEC network functions (NFs) 621 (including, but not limited to a user plane function (UPF) 623), which are responsible for supporting features and capabilities facilitating user plane operation, such as packet routing and forwarding, interconnection to a data network, policy enforcement, data buffering, and so on. MEC hosting infrastructure 607 also includes information about the resources of MEC site 600, such as input/output (I/O) resources 625 for data input or output resources of MEC site 600, storage resources 627 for storing data or information by MEC site 600, network resources 629 for communications by MEC site 600, and a virtualization layer 631 for executing programs or applications in a VM (i.e., virtualization layer 631 information that supports the execution of a service in a VM on MEC nodes of MEC site 600) by MEC site 600.

MEC system choreography function 611 accepts service task requests, verifies policy, performs planning (e.g., resource planning, priority planning, geo-location based planning, etc.), schedules tasks and jobs, and distributes the jobs. MEC system choreography 611 includes a planning function 639, a policy management function 641, and a scheduling function 643.

Planning function 639 performs resource planning, priority planning, geo-location based planning, etc. Planning function 639 also accepts task requests (as received from a mobile device, for example). Planning function 639 further shares information regarding resource status (such as a computational resource status), number of computational resources available, number of computational resources idle, percentage of computational resources available, percentage of computational resources idle, and so on. In other words, planning function 639 performs high-level planning of resources, priority, etc., based on geo-location information, and partitions the service based on computational resource availability. Should a change occur to some of the geo-location information (e.g., the route of the mobile device changes, etc.) that impacts the MEC sites and MEC nodes making up the virtual resource pool, planning function 639 may need to repeat the high-level planning for the service to reflect the changed geo-location information.

Policy management function 641 verifies policy, such as QoS policy matching, security matching, and so on. Scheduling function 643 schedules the tasks and jobs associated with the service (as partitioned by planning function 639) and distributes the jobs to the MEC nodes. The jobs may be assigned to MEC nodes with policy restrictions, priority requirements, output deadlines, etc. In other words, scheduling function 643 performs low-level scheduling of tasks and jobs associated with the service to MEC nodes and MEC sites. Typically, scheduling function 643 dynamically schedules the tasks and jobs associated with the service based on changes in the geo-location information (e.g., the mobile device encounters a traffic jam and has to slow down, an accident causes a delay in the progress of the mobile device, and so on) that does not change the route of the mobile device but changes the location of the mobile device along the route as a function of time.

MEC services 609 includes services executing in MEC site 600. As shown in FIG. 6, MEC site 600 supports the execution of three services (e.g., services 633, 635, and 637). However, in practice, the number of services supported by a MEC site is dependent upon the resources of the MEC site, as well as the size and complexity of the services. As an example, the MEC site may support the execution of a large number of smaller and less complex services, while the same MEC site may be able to support a relatively small number of larger and more complex services.

In an embodiment, MEC distributed controller 603 operates in a distributed manner. Each MEC site may include a MEC distributed controller and each MEC distributed controller operates in conjunction with other MEC distributed controllers. In an embodiment, MEC distributed controllers that are relatively close to one another operate in conjunction with one another, where relative closeness may be defined as a distance parameter, a travel time parameter, a time parameter, and so on. The relative closeness may change based on environmental factors, traffic information, emergency information, etc. As an example, a MEC distributed controller of a first MEC site may share information related to the execution of a service with a MEC distributed controller of a second MEC site, and both MEC distributed controllers may perform planning, scheduling, and distribution for respective MEC nodes. As used herein, the distribution of the tasks and jobs may occur in a sequential or linear manner along the route of the mobile device, for example. The sequential distribution of the tasks and jobs adhere to the service time of the tasks or jobs. A detailed discussion of MEC distributed controller 603 and MEC system choreography function 611 is provided below.

In an embodiment, a single MEC site may have one or more MEC nodes. In a situation where the MEC site includes more than one MEC node, the MEC nodes may be connected in any of a variety of ways. As an example, the MEC nodes may be fully connected. As another example, the MEC nodes may be partially connected.

FIG. 7A illustrates a first example configuration 700 of MEC node connectivity. As shown in FIG. 7A, a plurality of MEC nodes (including but not limited to MEC nodes 705, 706, 707, and 708) is partially connected, with some MEC nodes directly connected to each other, such as MEC nodes 705 and 706, MEC nodes 705 and 707, etc. and some MEC nodes being indirectly connected to each other, such as MEC nodes 705 and 708, MEC nodes 706 and 707, and so on.

FIG. 7B illustrates a second example configuration 750 of MEC node connectivity. As shown in FIG. 7B, a plurality of MEC nodes (including but not limited to MEC nodes 755, 756, 757, and 758) is partially connected, with MEC nodes only being connected to their immediate neighbor, such as MEC nodes 755 and 756, MEC nodes 757 and 758, etc. Furthermore, each MEC node is connected to stream 760, which provides an instruction stream, a data stream, or both an instruction and a data stream, to the MEC nodes.

In an embodiment, the MEC distributed controller is decentralized, with each MEC site having a MEC distributed controller implementation. As an example, each MEC site features a MEC system choreography function with a decentralized planning function, a decentralized policy management function, and a decentralized scheduling function. In an embodiment, although each of the MEC sites includes a decentralized MEC distributed controller, collaboration is performed between the MEC distributed controllers. Collaboration between the MEC distributed controllers may include the sharing of planning information, policy information, scheduling information, priority information, task times and deadlines, geo-location information, and so forth.

In an embodiment, the collaboration between the MEC distributed controllers of the MEC sites is dependent on the geo-location of the mobile device and the route of the mobile device. As an example, the MEC distributed controllers of MEC sites that are on the route of the mobile device can collaborate to plan, schedule, and distribute tasks associated with the execution of the service offloaded by the mobile device. A detailed discussion of the collaboration is provided below. As another example, the degree of collaboration between the MEC distributed controllers of MEC sites that are on the route of the mobile device is dependent on the relative proximity of the MEC sites. For example, MEC sites that are adjacent and are on the route of the mobile device will typically have a greater degree of collaboration than MEC sites that are not adjacent to but are still on the route of the mobile device.

The amount of collaboration between the various MEC distributed controllers may be dependent on the relative proximity of the different MEC sites. As an example, the degree of collaboration between the MEC distributed controllers of two physically close MEC sites is higher than the degree of collaboration between the MEC distributed controllers of two widely separated MEC sites. Similarly, the degree of collaboration between the MEC distributed controllers of two adjacent MEC sites located along a busy highway is higher than the degree of collaboration between the MEC distributed controllers of two MEC sites located on different highways that are not connected.

FIG. 8 illustrates a MEC platform 800 highlighting decentralized planning functions of MEC distributed controllers of MEC sites. MEC platform 800 includes a plurality of MEC sites (including MEC sites 805-808). The MEC sites of the plurality of MEC sites are interconnected. Each MEC site includes a plurality of MEC nodes. As an example, MEC site 808 includes MEC nodes 810-812. Although each of the MEC sites of the plurality of MEC sites are shown as having the same number of MEC nodes, it is possible for different MEC sites to have different number of MEC nodes.

In a decentralized MEC system choreography function 814, multiple instances of a planning function, such as planning functions 815-818, are shown performing planning operations, including resource planning, priority planning, geo-location based planning, etc. Each planning function is associated with a MEC site. As an example, planning function 815 is associated with MEC site 805, planning function 816 is associated with MEC site 806, and so on. Instances of other functions of a MEC system choreography function 814 may also be included in decentralized MEC system choreography function 814, including policy management functions, and scheduling functions.

According to an example embodiment, the MEC framework provides a single workload management interface. A single workload management interface provides a virtual single resource interface over the geographically distributed MEC sites and MEC nodes. The MEC framework application programming interface (API) enables a single workload management interface where, conceptually, a mobile device interacts with a single decentralized MEC distributed controller rather than multiple individual MEC sites to perform planning functions, policy management functions, and scheduling functions. However, multiple MEC sites may implement their own decentralized MEC distributed controller. In an embodiment, each MEC site implements its own decentralized MEC distributed controller. In another embodiment, a subset of the MEC sites implement decentralized MEC distributed controllers. As an example, in a deployment where there are multiple MEC sites that are closely located, one of these MEC sites may implement a decentralized MEC distributed controller that performs planning functions, policy management functions, and scheduling functions for the multiple MEC sites in the general area. The MEC framework manages the tasks associated with the offloaded service along the MEC platform. Furthermore, a method and apparatus of service workload abstraction that is based on priority, geo-location (e.g., location, route, etc.), application QoS, account QoS, computational type, and so on, are provided.

The infrastructure provided by the MEC sites is virtualized and provides the following:

Dynamic resource management that follows the movement (e.g., route) of the mobile device. Management is provided for the resources of MEC sites and MEC nodes along the route of the mobile device to enable the timely execution of tasks associated with the service offloaded by the mobile device.

The synchronization of the status of neighboring MEC nodes and MEC sites enables the scheduling of tasks to available computational resources.

Knowledge of different MEC node computational resources and resource types, along with their respective capabilities.

The mapping of the workload (the tasks associated with the offloaded service of the mobile device, as well as the tasks of other mobile devices) and the mapping of the tasks to the computational resources.

Figure 9:
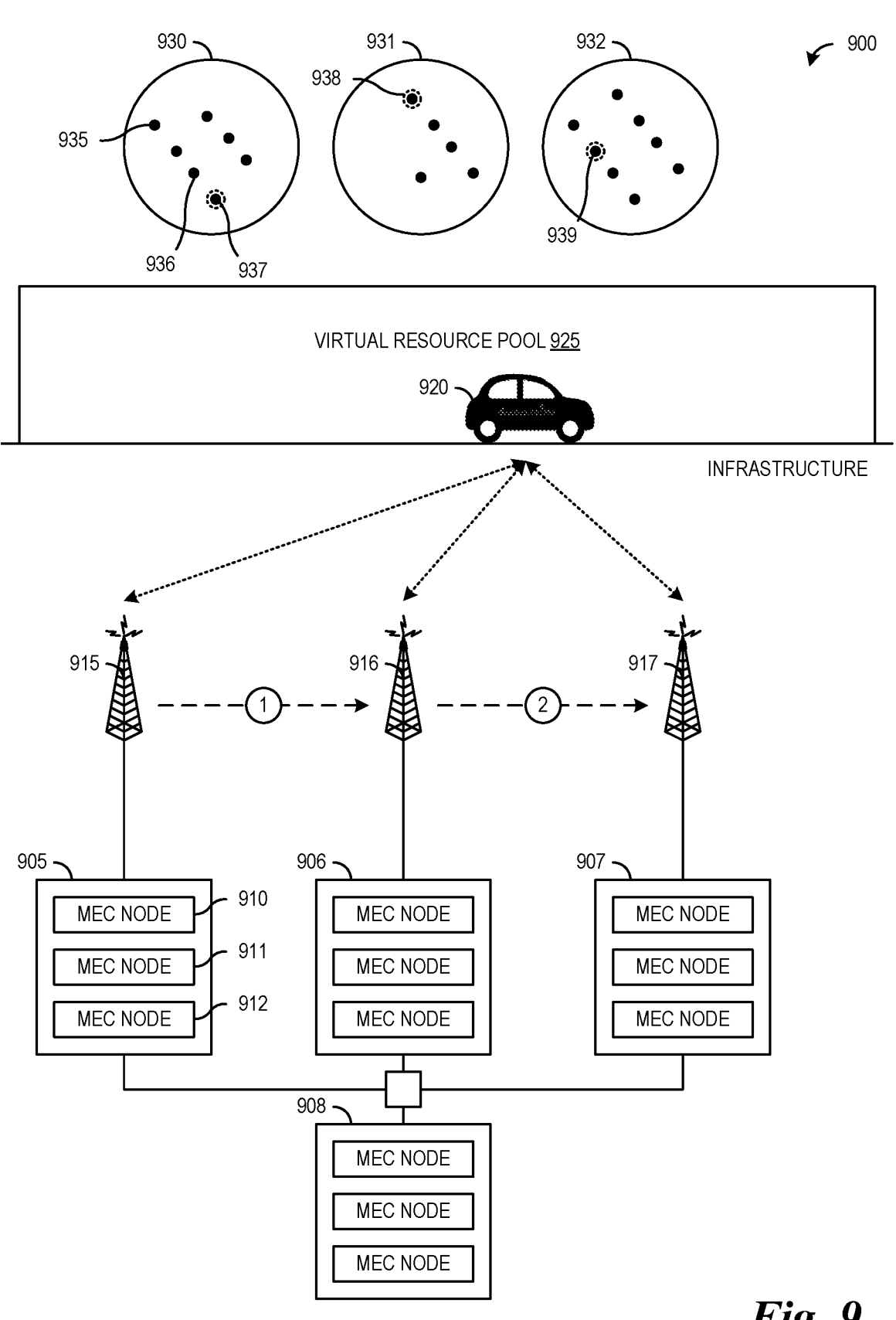
FIG. 9 illustrates a MEC platform highlighting the virtualization of the infrastructure provided by the MEC framework according to example embodiments presented herein.

FIG. 9 illustrates a MEC platform 900 highlighting the virtualization of the infrastructure provided by the MEC framework. MEC platform 900 includes MEC sites (such as MEC sites 905-908), with each MEC site comprising a plurality of MEC nodes (such as MEC site 905 comprising MEC nodes 910, 911, and 912). Antennas, such as antennas 915, 916, and 917, provide RAN connectivity for mobile device 920 to MEC sites. As shown in FIG. 9, antenna 915 provides connectivity for MEC site 905, antenna 916 provides connectivity for MEC site 906, and antenna 917 provides connectivity for MEC site 907.

Virtual resource pool 925 represents a virtualization of the resources of the MEC sites and MEC nodes of MEC platform 900, such as resource groups 930-932. As an example, resource group 930 represents the resources of MEC site 905, resource group 931 represents the resources of MEC site 906, and resource group 932 represents the resources of MEC site 907. As shown in each resource group, each solid black circle (e.g., black circles 935 and 936) represents a single computational resource, such as a MEC node, of a MEC site.

The system choreography function of the decentralized MEC distributed controller selects one or more resources to execute at least a portion of tasks associated with the offloaded service. As an example, the system choreography function of the decentralized MEC distributed controller selects a resource corresponding to highlighted circle 937 of resource group 930 to execute the portion of the tasks on MEC site 905. Similarly, the system choreography function of the decentralized MEC distributed controller selects a resource corresponding to highlighted circle 938 of resource group 931 to execute the portion of the tasks on MEC site 906 and a resource corresponding to highlighted circle 939 of resource group 932 to execute the portion of the tasks on MEC site 907.

In an embodiment, depending on resource availability and requirements of the tasks associated with the offloaded service, the decentralized MEC distributed controller may be able to select zero or more resources to execute a portion of the tasks. As an example, the decentralized MEC distributed controller may select one resource from a first resource group to execute a first portion of the tasks associated with the offloaded service. If insufficient resources are available at a resource group to execute the first portion of the task, resources at a different resource group may need to be selected to execute the first portion of the task. As another example, the decentralized MEC distributed controller may select two resources from a second resource group to execute a second portion of the tasks associated with the offloaded service. The decentralized MEC distributed controller may select two resources of the second resource group (as compared to only one resource of the first resource group) due to a variety of factors, such as: the second portion of the tasks has greater resource requirement that the first portion of the tasks; the mobile device remains in the proximity of the second resource group for longer than the first resource group (as determined by the route of the mobile device, for example), hence, a larger portion of the service is expected to be executed while the mobile device is in the proximity of the second resource group; the first portion of the tasks was not assigned to any resource of the first resource group and resources from the second resource group has to be assigned to execute the first portion of the tasks; and so forth.

Figure 10:
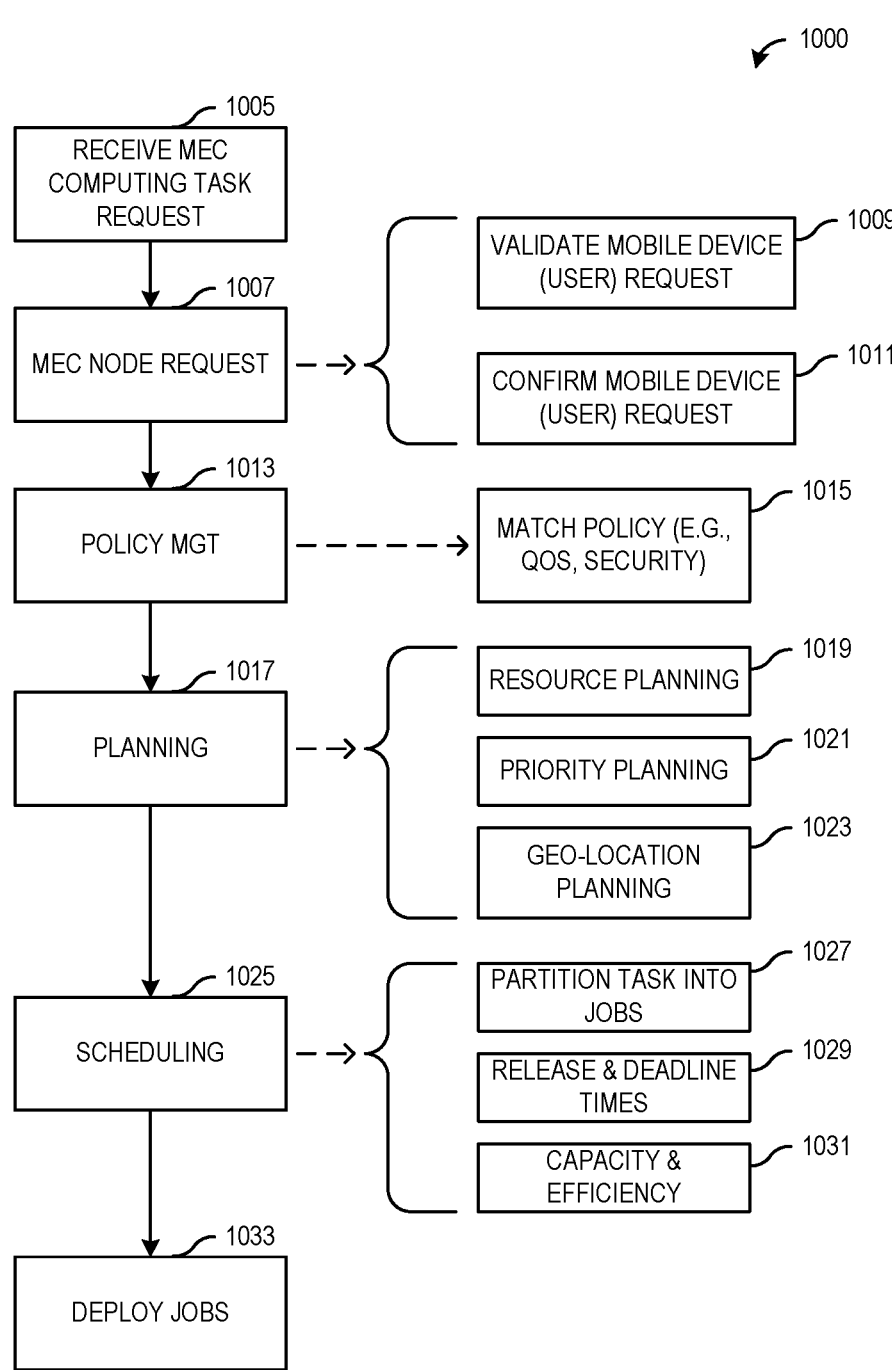
FIG. 10 illustrates a flow diagram of example operations occurring in a MEC framework workflow according to example embodiments presented herein.

FIG. 10 illustrates a flow diagram of example operations 1000 occurring in a MEC framework workflow. Operations 1000 may be indicative of operations occurring in a MEC framework as the MEC framework receives a MEC computing task request to offload the execution of a service and deploys jobs associated with the execution of the service onto resources of MEC sites in order to support service mobility and ensure an acceptable user experience.

Operations 1000 begin with the MEC framework receiving a MEC computing task request (block 1005). The MEC framework may receive a MEC computing task request from a mobile device that is connected to the MEC platform. The MEC computing task request may be a request to offload the execution of a service, where the execution of the service is being offloaded from a single server to resources of the MEC platform. The MEC computing task request may be initiated by a mobile application executing on the mobile device using a MEC API, for example. MEC fluid framework API is an example of the MEC API.

The MEC computing request may provide information used in offloading the service, including the service being offloaded, the priority of the mobile device (or user of the mobile device), user information (e.g., account information, priority information, QoS requirements and restrictions, and so on), mobile device information (e.g., account information, priority information, QoS requirements and restrictions, and so forth), geo-location information (including the current location, the destination, the route of the mobile device (provided by navigation application, for example), etc.

A MEC node request is issued (block 1007). The MEC node request may be issued to the various MEC sites and MEC nodes along the route of the mobile device, for example. The MEC node request is used to validate and confirm the mobile device (e.g., the user of the mobile device or the user of the mobile application) request (blocks 1009 and 1011). Policy management is performed (block 1013). Policy management is performed by policy management function of the decentralized MEC distributed controller, and for example, may match up the policies (e.g., QoS policies, security policies, and so on) of the service, the mobile device, the user, and the resources of the MEC platform (block 1015). The policy management may comprise a fluid framework policy management, for example.

Planning is performed (block 1017). The planning may comprise a fluid framework planning, for example. Planning determines an execution plan for the execution of the offloaded service on the MEC platform. As an example, the execution plan specifies the tasks associated with the off-loaded server, specifies resources to execute the tasks, and so on. Planning is performed by a planning function of the decentralized MEC distributed controller, and for example, includes resource planning (block 1019), priority planning (block 1021), and geo-location planning (block 1023). Resource planning may include determining the resources required to execute the offloaded service. As an example, resource planning determines a total amount of resources required to execute the offloaded service. As another example, resource planning determines an amount of resources required at each MEC site to execute a portion of the offloaded service expected to be executed while the mobile device is connected to the MEC site. In this example, the resource planning makes use of the route of the mobile device, as well as traffic information (e.g., traffic condition, traffic congestion, etc.), topography information (e.g., alternate road or route information, and so on), geography information (e.g., geographic features that may impact mobile device connectivity, and so forth), and so on.

Priority planning may be similar to resource planning, but with consideration being given to priority information. Priority planning may utilize the priority information to help ensure that QoS and security restrictions and requirements are met, for example. As an example, resources may be stratified in accordance with the priority of the offloaded service, the mobile device, or both the offloaded service and the mobile device.

Geo-location planning utilizes the geo-location information of the mobile device to help resource planning and priority planning. As an example, the geo-location information may help determine the resources required at each MEC site along the route of the mobile device to provide sufficient performance to meet user experience expectations, meet QoS and security restrictions, and so forth. Furthermore, geo-location information (such as traffic condition information, emergency information, etc.) may be used to adjust the resource planning and the priority planning. As an example, an unexpected traffic jam may require that additional resources be allocated at some MEC sites to ensure that sufficient resources are available to execute the offloaded service. Conversely, unexpectedly expeditious traffic may result in some previously allocated resources at some MEC sites becoming available for reallocation to the execution of other services.

Scheduling is performed (block 1025). Scheduling may be performed by a scheduling function of the decentralized MEC distributed controller. Scheduling involves the partitioning of the tasks associated with the offloaded service into jobs that can be executed by the resources of the MEC sites (block 1027). If a task is too computationally intensive to complete within a time requirement, the task may be partitioned into multiple jobs. Scheduling also involves the assignment of release and deadline times to the tasks or jobs to ensure that the jobs are started at appropriate release times, to guarantee that the tasks or jobs complete prior to the deadline times (block 1029). Adherence to the release and deadline times may ensure that the user experience, as well as QoS and security restrictions and requirements, are met. The scheduling may be performed in such a manner that the capacity of the different MEC sites is met. Furthermore, scheduling may help to keep the efficiency of the MEC sites high (block 1031). As an example, if the tasks or jobs are scheduled without concern being given to minimizing communication between far flung MEC sites, unnecessary communications may be performed between the MEC sites, which may lead to saturated communication links and potentially leading to poor communications performance and degraded overall performance. Similarly, an overused MEC site may lead to excessive switching of services in and out of the program memory of the MEC site, which can result in more time being devoted to switching the services than the actual execution of the services themselves.

The scheduled tasks or jobs are deployed (block 1033). Deployment of the scheduled tasks or jobs may include distributing data and information to the different MEC nodes of the MEC sites. As an example, a MEC node may be provided with information regarding the offloaded service that has been scheduled for the MEC node (such as which portion of the offloaded service has been scheduled for the MEC node), data that the MEC node is to process in the execution of the offloaded service, expected user interactions, release and deadline times, and so on. In an embodiment, job deployment may include any real-time changes to the scheduled tasks or jobs. As an example, an unexpected traffic jam or suddenly cleared traffic jam (or any other unplanned stop or change to the route of the mobile device) can lead to changes to the scheduled tasks or jobs. Changes to the scheduled tasks or jobs may be implemented by redistributing data and information to the impacted MEC nodes, for example.

FIG. 11 illustrates a flow diagram of example operations 1100 occurring in a mobile device offloading a service to a MEC platform. Operations 1100 may be indicative of operations occurring in a mobile device as the mobile device offloads execution of a service to a MEC platform. Rather than executing the service directly, which may require more resources than available at the mobile device, the mobile device offloads the service to the MEC platform, which will provide the resources to execute the service. The MEC platform also provides planning and scheduling infrastructure to support the execution of the service.

Operations 1100 begin with the mobile device requesting a MEC computing task (block 1105). The MEC computing task may be a request to offload an application to the MEC platform, where the MEC platform provides the resources to execute the offloaded service. The mobile device may request the MEC computing task by sending a MEC computing request to a MEC site to which it is currently connected. The MEC computing request may provide information used in offloading the service, including the service being offloaded, the priority of the mobile device (or user of the mobile device), user information (e.g., account information, priority information, QoS requirements and restrictions, and so on), mobile device information (e.g., account information, priority information, QoS requirements and restrictions, and so forth), geo-location information (including the current location, the destination, the route of the mobile device (provided by navigation application, for example), etc.

The request is verified (block 1107). The verification of the request may involve validating the request and confirming the request. Validation of the request may comprise authenticating the account of the mobile device (or the user), including the priority level of the account, the security level of the account, the status of the account, and so on. Confirming the request may comprise prompting the user to confirm the desire to offload the service, for example.

The mobile device interacts with the MEC nodes and MEC sites (block 1109). As part of the execution of the service, the mobile device (or user of the mobile device) may provide input to the service and receive output from the service. The mobile device may also interact with the service. The mobile device receives results of the execution of the service (block 1111). The execution of the service may produce results that are provided to the mobile device as the results are produced. The execution of the service may also produce results when the execution completes. In either situation, the results are provided to the mobile device.

FIG. 12 illustrates a flow diagram of example operations 1200 occurring in offloading a service to a MEC platform. Operations 1200 may be indicative of operations occurring in a decentralized MEC distributed controller as the decentralized MEC distributed controller participates in offloading a service to a MEC platform.

As discussed previously, the decentralized MEC distributed controller performs operations to help ensure that the execution of the offloaded service provides a good user experience while meeting QoS and security requirements and restrictions. Furthermore, the decentralized MEC distributed controller helps to ensure that the capacity and efficiency of the MEC sites and nodes are maintained. As an example, the decentralized MEC distributed controller may perform load balancing to help ensure that no one particular MEC site or MEC node is overloaded, which may decrease the capacity and efficiency of the MEC platform.

Operations 1200 begin with receiving a MEC computing task request (block 1205). The MEC computing task request may provide information used in offloading the service, for example. The MEC computing task request may be received from the mobile device that is offloading the service. The MEC computing task request is verified (block 1207). The verification of the request may involve validating the request and confirming the request. The verification of the request may involve issuing MEC node requests to MEC nodes and MEC sites along the route of the mobile device to validate and confirm the mobile device. As an example, subscriptions or accounts of the mobile device are verified at the MEC nodes and MEC sites.

The decentralized MEC distributed controller performs policy management (block 1209). Policy management may involve matching up policies, such as QoS policies, security policies, and so on, of the service, the mobile device, and the resources of the MEC platform. The decentralized MEC distributed controller performs planning (block 1211). Planning includes resource planning, priority planning, and geo-location planning. Resource planning may include determining the resources required to execute the offloaded service. Priority planning may be similar to resource planning, but with consideration being given to priority information. Geo-location planning utilizes the geo-location information of the mobile device to help resource planning and priority planning.

The decentralized MEC distributed controller performs scheduling (block 1213). Scheduling also involves the partitioning of the tasks associated with the offloaded service into jobs that can be executed by the resources of the MEC sites if some of the tasks are too computationally intensive for a single MEC node to complete within the allotted time. Scheduling may also include mapping the tasks or jobs to the MEC nodes chosen to execute the tasks or jobs. Scheduling also determines a worst-case execution time for the chosen MEC nodes. Scheduling also involves the assignment of release and deadline times to the tasks or jobs to ensure that the tasks or jobs are started at appropriate release times to guarantee that the tasks or jobs complete prior to the deadline times. Scheduling makes use of geo-location information to schedule the tasks or jobs so that the tasks or jobs complete at or near the times when the mobile device is within range of the MEC site with the resource(s) executing the jobs. Scheduling also makes use of traffic information, emergency information, topography information, geography information, and so forth. Adherence to the release and deadline times may ensure that the user experience, as well as QoS and security restrictions and requirements are met. Scheduling also considers the load already present at the MEC sites and MEC nodes. The scheduling may be performed in such a manner that the capacity of the different MEC sites is met. Furthermore, scheduling may help to keep the efficiency of the MEC sites high.

The decentralized MEC distributed controller deploys the tasks or jobs (block 1215). The tasks or jobs are deployed as scheduled by the decentralized MEC distributed controller. Deployment of the scheduled tasks or jobs may include distributing data and information to the different MEC nodes of the MEC sites. Any changes that result in a change in the scheduled tasks or jobs may cause the decentralized MEC distributed controller to repeat the deploying of the tasks or jobs. Changes to the scheduled jobs may be implemented by redistributing data and information to the impacted MEC nodes, for example.

FIG. 13 illustrates a flow diagram of example operations 1300 occurring in a MEC node executing an offloaded service. Operations 1300 may be indicative of operations occurring in a MEC node as the MEC node executes an offloaded service. The MEC node may execute jobs scheduled for the MEC node.

Operations 1300 begin with the MEC node receiving task(s) or job(s) (block 1305). The MEC node receives data and information related to the task(s) or job(s) assigned to the MEC node. As an example, the MEC node may be provided with information regarding the offloaded service that has been scheduled for the MEC node (such as which portion of the offloaded service scheduled for the MEC node), data that the MEC node is to process in the execution of the offloaded service, expected user interactions, release and deadline times, and so on. Any updates to the scheduled job(s) for the MEC node may result in the MEC node receiving updated data and information. The MEC node executes the task(s) or job(s) and interacts with the mobile device (block 1307). The MEC node executes the task(s) or job(s) based on the provided release and deadline times to ensure that the MEC node completes the execution of the task(s) or job(s) before the deadline time. The MEC node may interact with the mobile device. As an example, the MEC node may receive data from the mobile device. The MEC node may also receive user input from the mobile device. The MEC node may also provide information or data to the mobile device.

According to an example embodiment, the planning of resources associated with the offloaded service is in accordance with an objective function. It may be possible to simply assign the tasks or jobs associated with the offloaded service to MEC sites and MEC nodes with resources sufficient to execute the jobs in a timely manner. However, this simplistic approach to planning may result in some MEC sites and MEC nodes being overburdened, with other MEC sites and MEC nodes being underutilized. This leads to low efficiency in the MEC platform, as well as poor usage of the capacity of the MEC platform.

In an embodiment, the planning of resources occurs with respect to an objective function that optimizes the efficiency and capacity of the MEC platform. The planning of resources with an objective function helps to distribute the tasks or jobs associated with the service over multiple MEC sites and MEC nodes helps to prevent the overburdening of some MEC sites and MEC nodes.

As an illustrative example, consider the following situation: A mobile device is moving along a route and intends to offload the execution of the service to the MEC platform. The service comprises tasks Ti, which are assigned to appropriate resources of the MEC sites and MEC nodes of the MEC platform. The following notation is used:

nn: the number of MEC nodes in the planning;

MEC={MN1, MN2, . . . , MNnn}: the set of MEC nodes being considered, with MNi denotes MEC node i;

MNCi: the computing capacity at MEC node MNi;

T={T1, T2, . . . , Tm}: A set of tasks planned to execute on MEC nodes where m is the number of tasks in consideration;

Ti={Ji,1, . . . , Ji, ji}: Task i contains a sequence of ji jobs. The jobs must be executed sequentially, that is, Ji,j+1 cannot be started until Ji,j finishes;

JCi,j: Computational requirement of task Ji,j;

JRTi,j: Release time of task Ji,j; and

Pij: Within a predicted duration of a time period (for a specific node, because different facility computation power is different), each Ti's job must finish after its release. This implies that for any consecutive pair Ji,j and Ji,j+1 in Ti, JRi,j+1>=JRi,j+Pij.

All the Notations Presented Above have Known Values for Planning:

JSTi,j: the actually start time to execute of job Ji,j; and

JMNi,j: MEC node assigned to execute job Ji,j.

An Example Planning is as Follows:

Given $i \in [1,m]$ and $j \in Ti$, $$JRTi,j <= JSTi,j \tag{1}$$

$$1 <= JMNi,j <= JMNi,j+1 <= nn \tag{2}$$

Given $i \in [1,m]$ and $j \in Ti$ and $JMNi,j=k, k \in [1,nn]$(k: node)

$$JSTi,j+JCi,j/MNCk <= JRTi,j+Pij \tag{3}$$

Given $k \in [1,nn], i \in [1,m], j \in Ti, JMNi,j=k$, to=Min (JSTi,j), and t1=Max (JSTi,j+Pij)

$$\Sigma JCi,j <= MNCk*(Max(\{JSTi,j+Pij\})-Min(\{JSTi,j\})) \tag{4}$$

where: Equations (1), (2), and (3) are constraint equations. A possible solution is the determination of JSTi,j and JMNi,j that satisfy the constraint equations. Among multiple solutions, a best solution that would embody the predetermined service policy is selected.

In an embodiment, the planning of resources is a dynamic programming problem. The planning of resources is a problem where, for a given task Ti, an objective function may be defined. As an example, each MEC node has an associated cost and value that can be used to determine if the MEC node should be assigned to execute the task Ti. An example associated cost for a MEC node may be computing time. An example associated value for a MEC node may be a function of geo-location, priority, computational capability or capacity, and so on.

At a particular time t, MEC nodes may dynamically join the virtual resource pool. As an example, at the particular time t, a MEC node can join the virtual resource pool because it is expected that the mobile device is approaching the MEC site that includes the MEC node (where the expectation that the mobile device is approaching the MEC site being determined based on the route of the mobile device). Similarly, MEC nodes may be dropped from the virtual resource pool. As an example, at the particular time t, a MEC node can be dropped from the virtual resource pool because it is expected that the mobile device is leaving the MEC site that includes the MEC node (where the expectation that the mobile device is leaving the MEC site being determined based on the route of the mobile device). As used in this discussion, approaching and leaving a MEC site refers to approaching and leaving a coverage area of the MEC site.

In general, each MEC node may be in one of three states: idle, acquired (locked), and serviced, where idle means that the MEC node is not executing a task, acquired means that the MEC node has been assigned a task, and serviced means that the MEC node is executing a task.

Therefore, to find a solution (i.e., the planning of resources or assigning the tasks to the MEC nodes) for a limited total computation time T (this is the total cost of the planning of resources), one or more MEC nodes are selected that can both execute the application (the tasks of the application) and maximize the value.

An Algorithmic Description of an Example Embodiment of the Solution is as Follows:

```
E[0][T]=0; ///Initial status. E is energy to be maximized.
if c[i]>T, ///If the cost of the MEC node i exceeds the total
then E[i][T]=E[i–1][T]; ///computation, then don't chose
    MEC node i.
else
E[i][T]=max {E[i–1][T–c[i]+v[i], E[i–1][T]};
    ///E[i][T]—Energy of MEC node i with time T con-
        straint,
    ///E[i–1][T–c[i]+v[i]]—illustrates when MEC node i–1
        is chosen, total
    ///available time for remaining MEC nodes is reduced
        by the cost: c[i]
    ///(here the cost is E[i–1][T–c[i]], and the total energy
        is increased by
    ///the value: v[i].
    ///E[i–1][T]—illustrates when MEC node i–1 is not
        chosen, total energy
    ///is the same as the last step.
    ///The larger of the two parts is chosen based on the
        criteria of
    ///maximizing the total energy.
```

In an embodiment, once the MEC nodes have been chosen to execute the tasks or jobs associated with the offloaded service, the deployment of the tasks or jobs include setting the state of upcoming MEC node resources that been chose to acquired or locked to help ensure that these MEC nodes not be chosen for other services. Not all of the MEC nodes chosen to execute an offloaded service have to be locked. Only those that are in close proximity to the mobile device should have their state changed. Not changing the state of every chosen MEC node allows these MEC nodes to be used for executing other services if the MEC nodes are not needed for a specified period of time. The specified period of time may be specified by an operator of the MEC platform, for example. The specified period of time may also be determined based on a time for executing a task or job, such as a worst-case execution time (WCET). After a MEC node completes executing its assigned task or job, the MEC node is released back into the virtual resource pool. The MEC node may be released back into the virtual resource pool by setting the state of the MEC node to idle, for example.

Figures 14A, 14B:
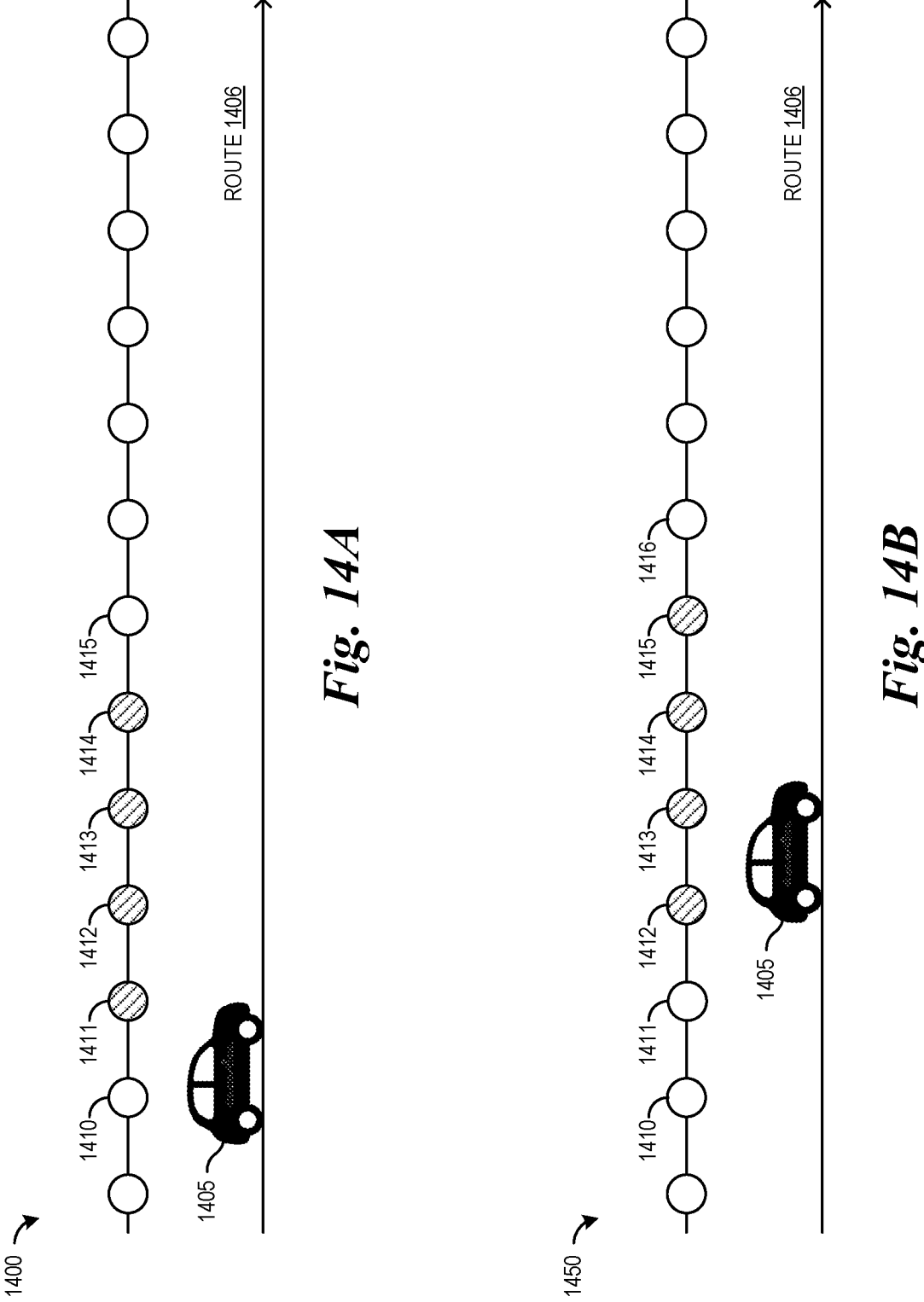
FIG. 14A illustrates a diagram of a mobile device and MEC nodes executing jobs of an offloaded service of mobile device at a first time instance according to example embodiments presented herein.
FIG. 14B illustrates a diagram of mobile device and MEC nodes executing jobs of an offloaded service of mobile device at a second time instance according to example embodiments presented herein.

FIG. 14A illustrates a diagram 1400 of a mobile device 1405 and MEC nodes executing jobs of an offloaded service of mobile device 1405 at a first time instance. At the first time instance, MEC nodes 1411, 1412, 1413, and 1414 (shown as dashed circles) are executing jobs associated with an offloaded service for mobile device 1405 (traversing route 1406), while other MEC nodes, such as MEC nodes 1410 and 1415 (shown as clear circles) are not chosen to execute jobs associated with the offloaded service (or at least not yet executing jobs associated with the offloaded service).

MEC nodes 1411, 1412, 1413, and 1414 may be MEC nodes that are within a time window of a current location of mobile device 1405. The MEC nodes that are within the time window may be expected to be serving mobile device 1405 or will be serving mobile device 1405 with a certain probability. The size of the time window may vary based on factors including environmental factors, traffic information, emergency information, etc. In general, the time window should be sufficiently large to enable efficient scheduling of multiple MEC nodes at any one time, however, the time window should not be too large or the uncertainty associated with mobility of mobile device 1405 may result in too many scheduled jobs and tasks having to be rescheduled.

As an alternative to a time window, the number of MEC nodes executing jobs for mobile device 1405 may be a prespecified value. As an example, in FIG. 14A, the number of MEC nodes is four, although other numbers may be prespecified. The number of MEC nodes may be related to the time window. As an example, if mobile device 1405 is moving rapidly, the number of MEC nodes may be larger, while if mobile device 1405 is moving slowly, the number of MEC nodes may be smaller.

FIG. 14B illustrates a diagram 1450 of mobile device 1405 and MEC nodes executing jobs of an offloaded service of mobile device 1405 at a second time instance. The second time instance occurs later in time than the first time instance. At the second time instance, MEC nodes 1412, 1413, 1414, and 1415 are within the time window and are executing jobs associated with an offloaded service for mobile device 1405 (traversing route 1406), while other MEC nodes, such as MEC nodes 1410, 1411, and 1416 are not chosen to execute jobs associated with the offloaded service (or at least not yet executing jobs associated with the offloaded service).

Figure 15:
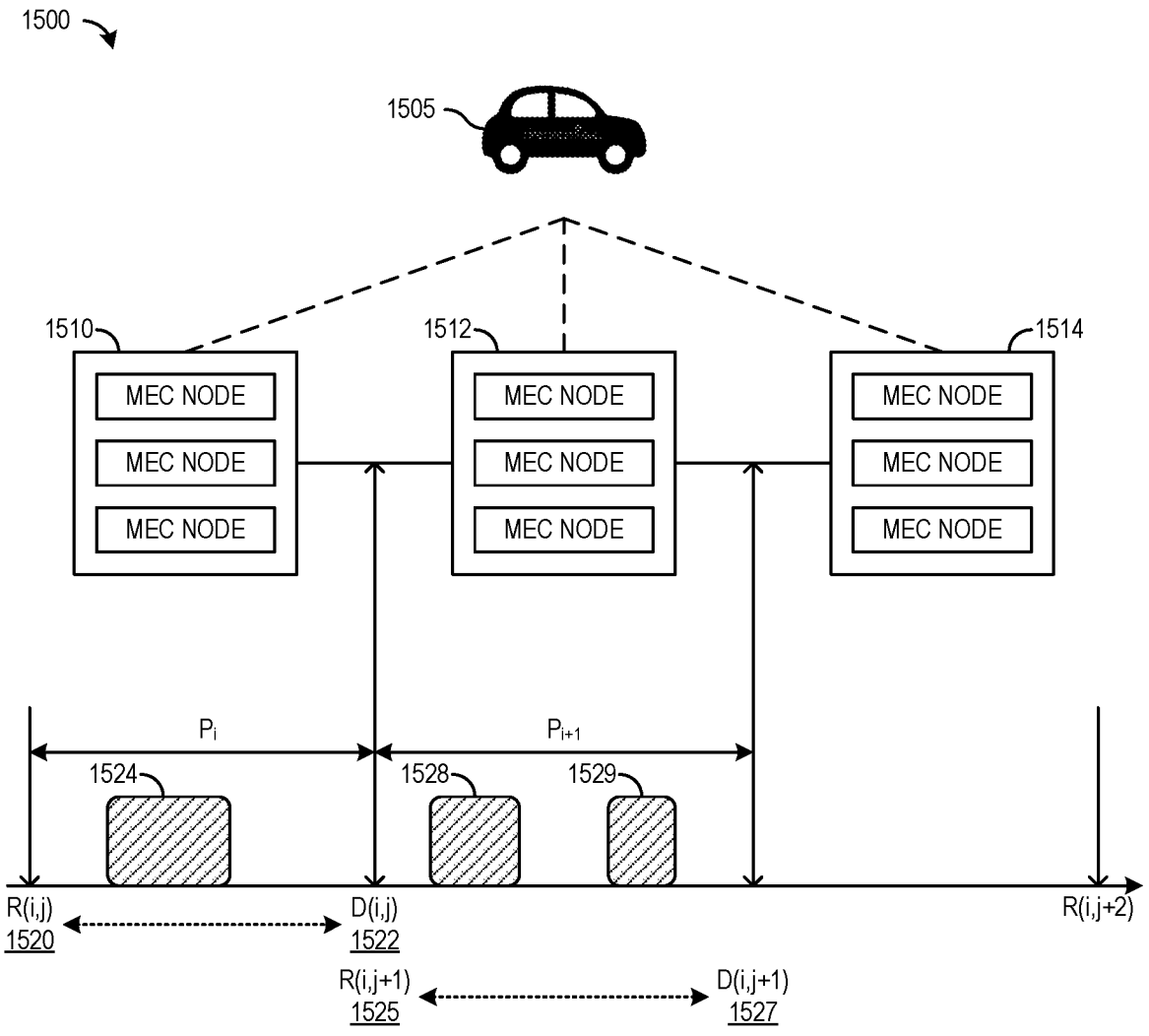
FIG. 15 illustrates a diagram of the scheduling of tasks associated with an offloaded service to MEC nodes according to example embodiments presented herein.

FIG. 15 illustrates a diagram 1500 of the scheduling of tasks associated with an offloaded service to MEC nodes. As shown in FIG. 15, MEC nodes of MEC sites 1510, 1512, and 1514 are chosen to execute tasks associated with the offloaded service of mobile device 1505.

As discussed previously, the decentralized MEC distributed controller of the MEC platform receives a MEC computing task request from mobile device 1505 to offload a service and deploys tasks of the offloaded service to MEC sites 1510-1514. In an embodiment, the decentralized MEC distributed controller receives the result of executing a task of the offloaded service at a current MEC site (e.g., MEC site 1510) and provides the result to a next MEC site (e.g., MEC site 1512). The decentralized MEC distributed controller controlling the propagation of the computational results may help to ensure that results are provided to the next MEC site correctly and on time.

The decentralized MEC distributed controller plans a computing MEC node and an output MEC node for a task Ti. The decentralized MEC distributed controller controls the sequence of processing flow and the relaying of the results between the MEC nodes. Given n tasks and a total of m MEC nodes, the decentralized MEC distributed controller determines where, when, and how long should the tasks execute in order to guarantee that deadlines (e.g., QoS restrictions and requirements) are met.

As shown in FIG. 15, the service has a periodicity Pi that is greater than or equal to the WCET of the offloaded service. Task Ti corresponds to a number of jobs, where $J(i,j)$ corresponds to the j-th job of task Ti ($j=1, 2, \ldots$). Also, each job has a release time $R(i,j)$ and a deadline time $D(i,j)$, where $D(i,j)=R(i,j)+Pi$. In general, each job needs ci resources, where ci is an integer number. As shown in FIG. 15, job j of task Ti has a release time $R(i,j)$ 1520 and a deadline time $D(i,j)$ 1522. Job j (shown as block 1524) is executed by MEC site 1510. Similarly, job j+1 of task Ti has a release time $R(i,j+1)$ 1525 and a deadline time $D(i,j+1)$ 1527. Job j+1 (shown as blocks 1528 and 1529) is executed by MEC site 1512.

Figure 16:
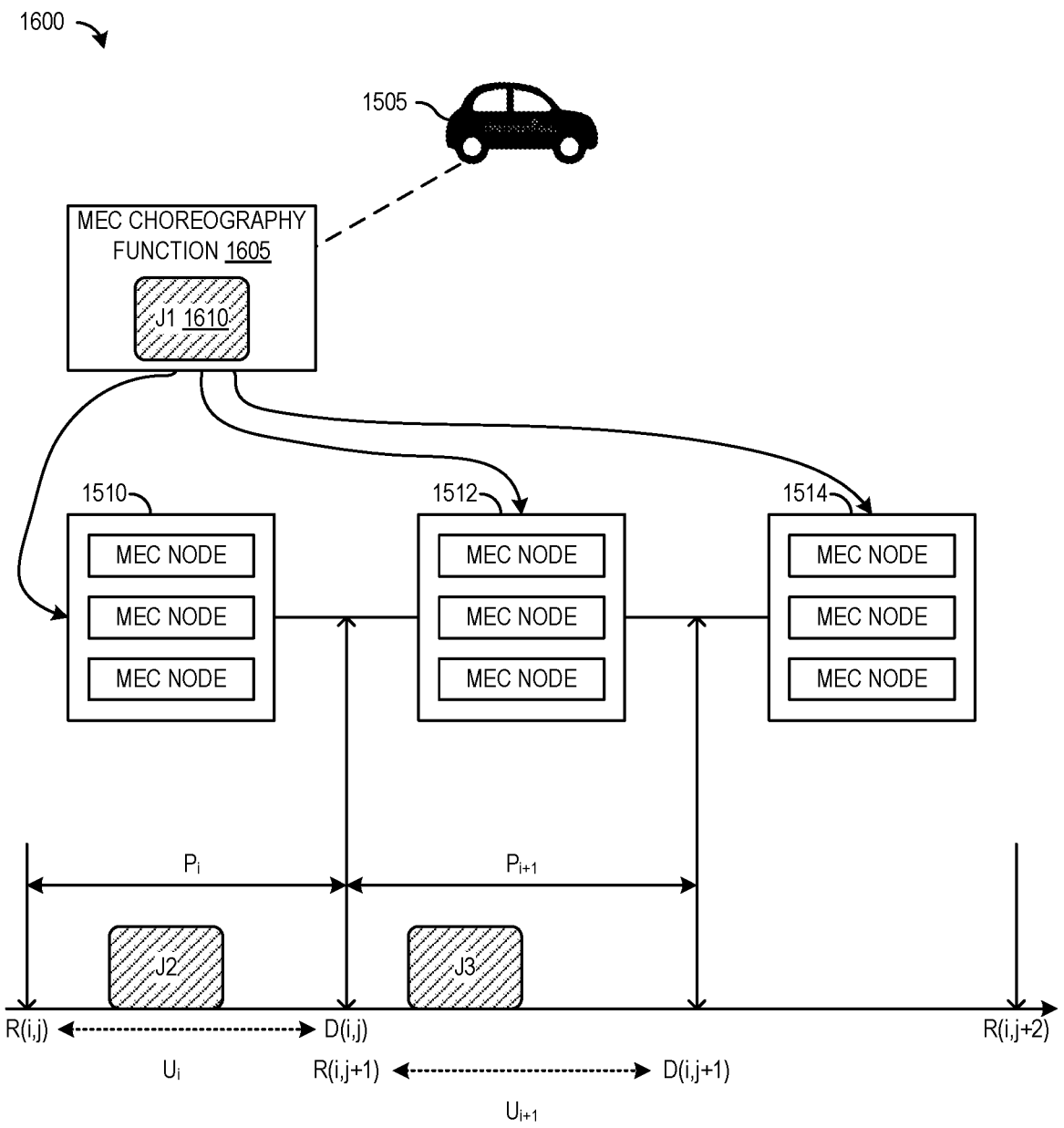
FIG. 16 illustrates a diagram of the scheduling of tasks associated with an offloaded service to MEC nodes, highlighting resource optimization according to example embodiments presented herein.

FIG. 16 illustrates a diagram 1600 of the scheduling of tasks associated with an offloaded service to MEC nodes, highlighting resource optimization. As shown in FIG. 16, MEC nodes of MEC sites 1510, 1512, and 1514 are chosen to execute tasks associated with the offloaded service of mobile device 1505. MEC system choreography function

1605 also utilizes the resource optimization as an input when scheduling the tasks or jobs. As an example, the utilization of task Ti is expressible as $$ui=ci/Pi.$$

A task set includes n tasks T1, T2, . . . , Tn and the total utilization is expressible as $$u\_total=summation(ui)=summation(ci/Pi).$$

Figure 17:
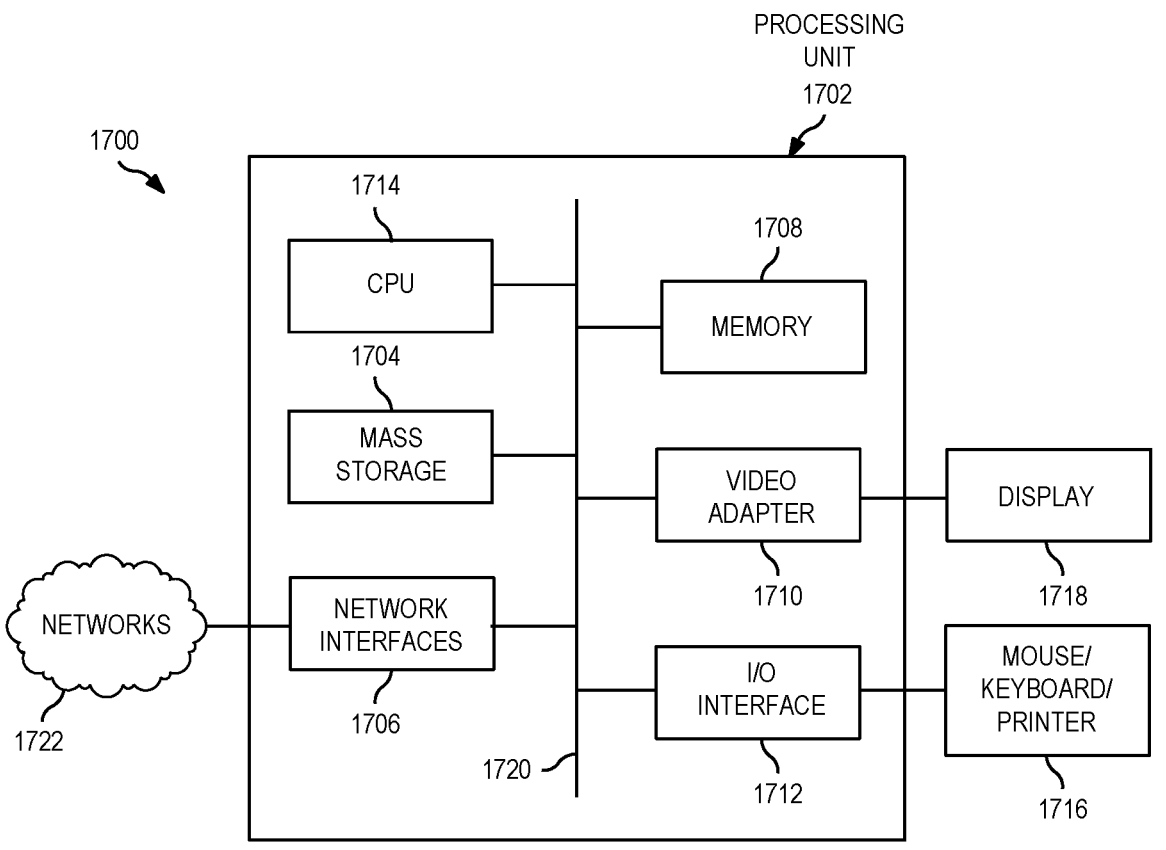
FIG. 17 is a block diagram of a computing system that may be used for implementing the devices and methods disclosed herein.

FIG. 17 is a block diagram of a computing system 1700 that may be used for implementing the devices and methods disclosed herein. For example, the computing system can be a MEC node or a MEC site. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1700 includes a processing unit 1702. The processing unit includes a central processing unit (CPU) 1714, memory 1708, and may further include a mass storage device 1704, a video adapter 1710, and an I/O interface 1712 connected to a bus 1720.

The bus 1720 may be one or more of any type of several bus architectures including a memory bus or memory controller, a peripheral bus, or a video bus. The CPU 1714 may comprise any type of electronic data processor. The memory 1708 may comprise any type of non-transitory system memory such as static random access memory (SRAM), dynamic random access memory (DRAM), synchronous DRAM (SDRAM), read-only memory (ROM), or a combination thereof. In an embodiment, the memory 1708 may include ROM for use at boot-up, and DRAM for program and data storage for use while executing programs.

The mass storage 1704 may comprise any type of non-transitory storage device configured to store data, programs, and other information and to make the data, programs, and other information accessible via the bus 1720. The mass storage 1704 may comprise, for example, one or more of a solid state drive, hard disk drive, a magnetic disk drive, or an optical disk drive.

The video adapter 1710 and the I/O interface 1712 provide interfaces to couple external input and output devices to the processing unit 1702. As illustrated, examples of input and output devices include a display 1718 coupled to the video adapter 1710 and a mouse, keyboard, or printer 1716 coupled to the I/O interface 1712. Other devices may be coupled to the processing unit 1702, and additional or fewer interface cards may be utilized. For example, a serial interface such as Universal Serial Bus (USB) (not shown) may be used to provide an interface for an external device.

The processing unit 1702 also includes one or more network interfaces 1706, which may comprise wired links, such as an Ethernet cable, or wireless links to access nodes or different networks. The network interfaces 1706 allow the processing unit 1702 to communicate with remote units via the networks. For example, the network interfaces 1706 may provide wireless communication via one or more transmitters/transmit antennas and one or more receivers/receive antennas. In an embodiment, the processing unit 1702 is coupled to a local-area network 1722 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method implemented by a multi-access edge computing (MEC) distributed controller, the method comprising:
    receiving, by the MEC distributed controller from a mobile device, a MEC computing task request for execution of a service on MEC nodes controlled by the MEC distributed controller;
    obtaining, by the MEC distributed controller, mobile device geo-location information associated with the mobile device, the mobile device geo-location information indicating predicted future locations of the mobile device;
    determining, by the MEC distributed controller, an execution plan and a pool of MEC nodes, the execution plan and the pool of MEC nodes being for the execution of the service, the determining the execution plan and the pool of MEC nodes being in accordance with the mobile device geo-location information indicating a current location of the mobile device and a planned route of the mobile device, the predicted future locations of the mobile device being at different time instances along the planned route, the execution plan and the pool of MEC nodes specifying the execution of the service for a time window or a specified number of MEC nodes;
    scheduling, by the MEC distributed controller, the execution plan for the pool of MEC nodes; and
    deploying, by the MEC distributed controller, the execution plan.

2. The method of claim 1, the determining the execution plan comprising:
    partitioning, by the MEC distributed controller, the execution of the service into a plurality of tasks, with each task of the plurality of tasks being executable on a MEC node; and
    selecting, by the MEC distributed controller, for the each task in the plurality of tasks, a corresponding subset of MEC nodes in the pool of MEC nodes, in accordance with a selection function.

3. The method of claim 2, the pool of MEC nodes being determined in accordance with one of a user account level of the mobile device or an account level of an owner of an application associated with the service.

4. The method of claim 2, the selecting the corresponding subset of MEC nodes comprising:
    generating, by the MEC distributed controller, for the each MEC node of the pool of MEC nodes, a corresponding cost and a corresponding value for executing the each task of the plurality of tasks; and
    selecting, by the MEC distributed controller, for each task of the plurality of tasks, the corresponding MEC node from the pool of MEC nodes, the selecting being in accordance with a cost and a value for executing the each task on the corresponding MEC node to produce the corresponding subset of the pool of MEC nodes.

5. The method of claim 4, the scheduling the execution plan comprising:

assigning, by the MEC distributed controller, release times and deadline times for the corresponding subset of the pool of MEC nodes.

6. The method of claim 5, the deploying the execution plan comprising:

providing, by the MEC distributed controller, application data associated with the execution of the service, the application data being provided to the corresponding subset of the pool of MEC nodes, the providing the application data being in accordance with the release times and the deadline times.

7. The method of claim 5, the release times comprising required start times, and the deadline times comprising required finish times for the plurality of tasks.

8. The method of claim 1, wherein the MEC computing task request includes at least one of a service account, a mobile device user identifier, or a number of MEC nodes the execution plan is intended to cover, and wherein the mobile device geo-location information includes at least a route of the mobile device.

9. The method of claim 1, further comprising:

updating, by the MEC distributed controller, the mobile device geo-location information of the mobile device to generate updated mobile device geo-location information in accordance with at least one of traffic information or emergency information;

determining, by the MEC distributed controller, an updated execution plan and an updated pool of MEC nodes in accordance with the updated mobile device geo-location information;

scheduling, by the MEC distributed controller, the updated execution plan for the updated pool of MEC nodes to produce an updated scheduled execution plan; and deploying, by the MEC distributed controller, the updated scheduled execution plan.

10. A multi-access edge computing (MEC) distributed controller comprising:

a memory storing instructions; and at least one processor in communication with the memory, the at least one processor configured, upon execution of the instructions, to perform steps comprising:

receiving, from a mobile device, a MEC computing task request for execution of a service on MEC nodes controlled by the MEC distributed controller;

obtaining mobile device geo-location information associated with the mobile device, the mobile device geo-location information indicating predicted future locations of the mobile device;

determining an execution plan and a pool of MEC nodes, the execution plan and the pool of MEC nodes being for the execution of the service, the determining the execution plan and the pool of MEC nodes being in accordance with the mobile device geo-location information indicating a current location of the mobile device and a planned route of the mobile device, the predicted future locations of the mobile device being at different time instances along the planned route, the execution plan and the pool of MEC nodes specifying the execution of the service for a time window or a specified number of MEC nodes;

scheduling the execution plan for the pool of MEC nodes; and deploying the execution plan.

11. The MEC distributed controller of claim 10, the determining the execution plan comprising:

partitioning the execution of the service into a plurality of tasks, with each task of the plurality of tasks being executable on a MEC node; and selecting for the each task in the plurality of tasks, a corresponding subset of MEC nodes in the pool of MEC nodes, in accordance with a selection function.

12. The MEC distributed controller of claim 11, the pool of MEC nodes being determined in accordance with one of a user account level of the mobile device or an account level of an owner of an application associated with the service.

13. The MEC distributed controller of claim 11, the selecting the corresponding subset of MEC nodes comprising:

generating, by the MEC distributed controller, for each MEC node of the pool of MEC nodes, a corresponding cost and a corresponding value for executing the each task of the plurality of tasks; and selecting, by the MEC distributed controller, for the each task of the plurality of tasks, the corresponding MEC node from the pool of MEC nodes, the selecting being in accordance with a cost and a value for executing the each task on the corresponding MEC node to produce the corresponding subset of the pool of MEC nodes.

14. The MEC distributed controller of claim 13, the scheduling the execution plan comprising:

assigning, by the MEC distributed controller, release times and deadline times for the corresponding subset of the pool of MEC nodes.

15. The MEC distributed controller of claim 14, the deploying the execution plan comprising:

providing, by the MEC distributed controller, application data associated with the execution of the service, the application data being provided to the corresponding subset of the pool of MEC nodes, the providing the application data being in accordance with the release times and the deadline times.

16. The MEC distributed controller of claim 14, wherein the MEC computing task request includes at least one of a service account, a mobile device user identifier, or a number of MEC nodes the execution plan is intended to cover, and wherein the mobile device geo-location information includes at least a route of the mobile device.

17. The MEC distributed controller of claim 10, the steps further comprising:

updating the mobile device geo-location information to generate updated mobile device geo-location information in accordance with at least one of traffic information or emergency information;

determining an updated execution plan and an updated pool of MEC nodes in accordance with the updated mobile device geo-location information;

scheduling the updated execution plan for the updated pool of MEC nodes to produce an updated scheduled execution plan; and deploying the updated scheduled execution plan.

18. A non-transitory computer-readable media storing computer instructions that configure at least one processor, upon execution of the computer instructions, to perform operations comprising:

receiving, from a mobile device, a multi-access edge computing (MEC) computing task request for execution of a service on MEC nodes controlled by a MEC distributed controller;

obtaining mobile device geo-location information associated with the mobile device, the mobile device geo-location information indicating predicted future locations of the mobile device;

determining an execution plan and a pool of MEC nodes, the execution plan and the pool of MEC nodes being for the execution of the service, the determining the execution plan and the pool of MEC nodes being in accordance with the mobile device geo-location information indicating a current location of the mobile device and a planned route of the mobile device, the predicted future locations of the mobile device being at different time instances along the planned route, the execution plan and the pool of MEC nodes specifying the execution of the service for a time window or a specified number of MEC nodes;

scheduling the execution plan for the pool of MEC nodes; and deploying the execution plan.

19. The non-transitory computer-readable media of claim 18, the determining the execution plan comprising:

partitioning the execution of the service into a plurality of tasks, with each task of the plurality of tasks being executable on a MEC node; and selecting for the each task in the plurality of tasks, a corresponding subset of MEC nodes in the pool of MEC nodes, in accordance with a selection function.

\* \* \* \* \*